June 20, 1967 G. R. ENGLUND ETAL 3,326,461
ACCOUNTING MACHINE INCLUDING IMPROVED DIFFERENTIAL
ASSEMBLIES AND CONTROLS THEREFOR
Original Filed March 14, 1962 20 Sheets-Sheet 1

INVENTORS
GOSTA R. ENGLUND AND
MATS E. MATTSSON
by Mason, Kolehmainen, Rathburn and Wyss
ATTORNEYS.

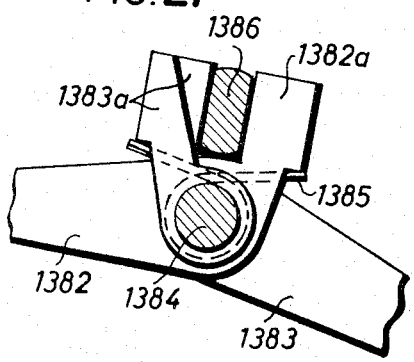
FIG. 21
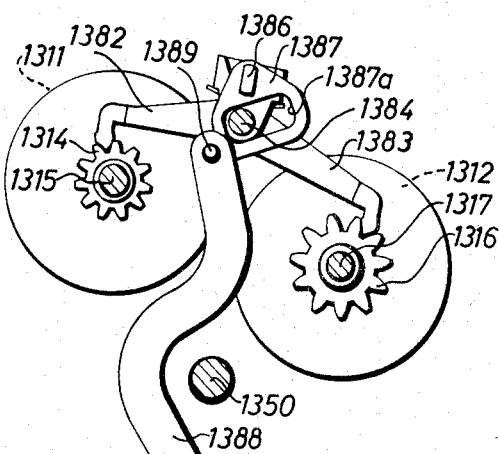
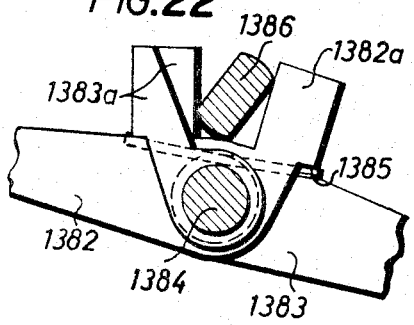
FIG. 22
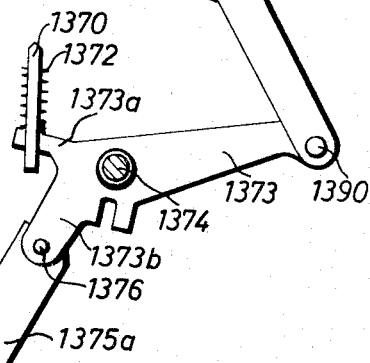
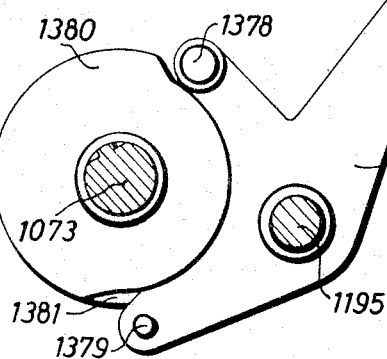
FIG. 20

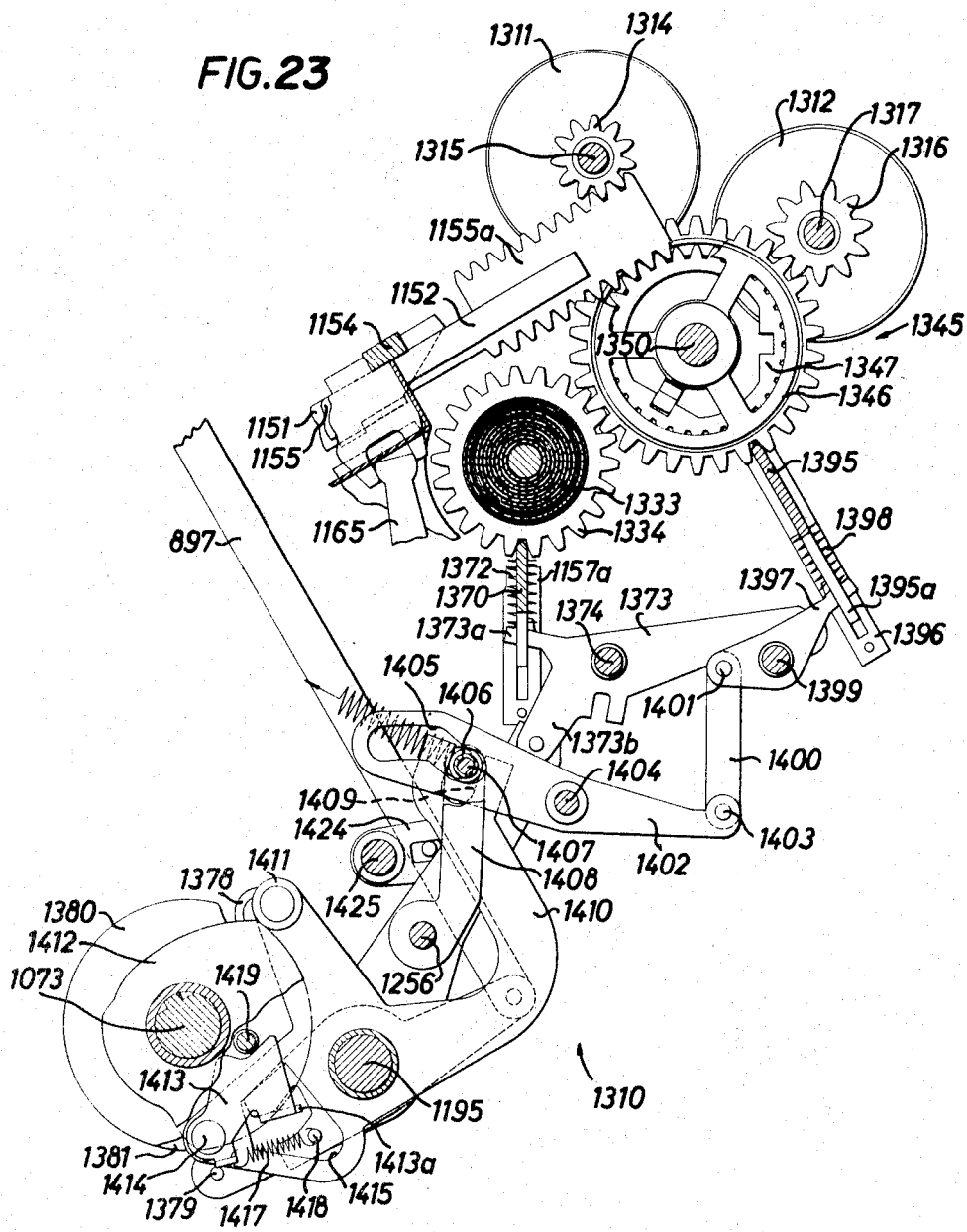

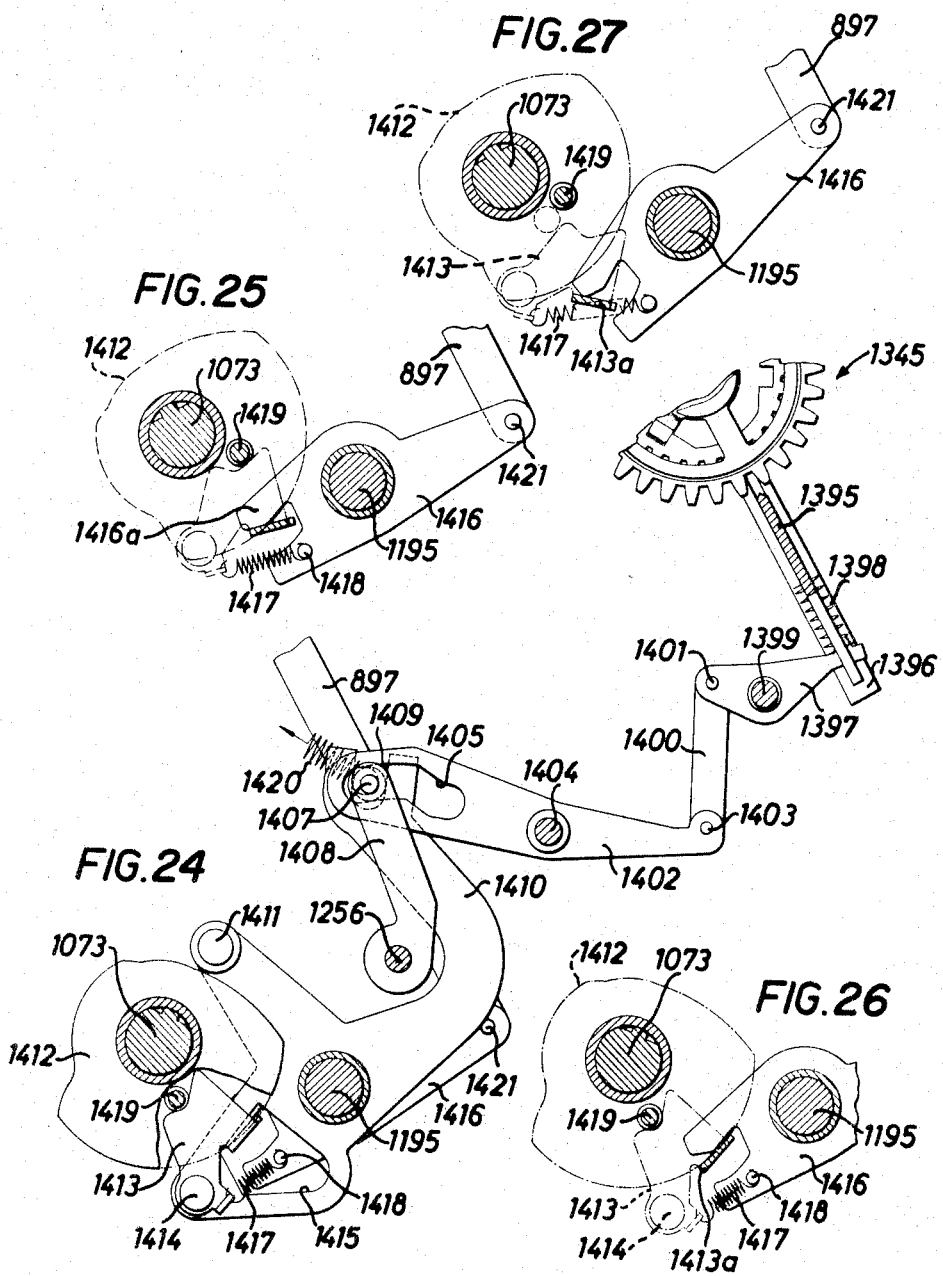

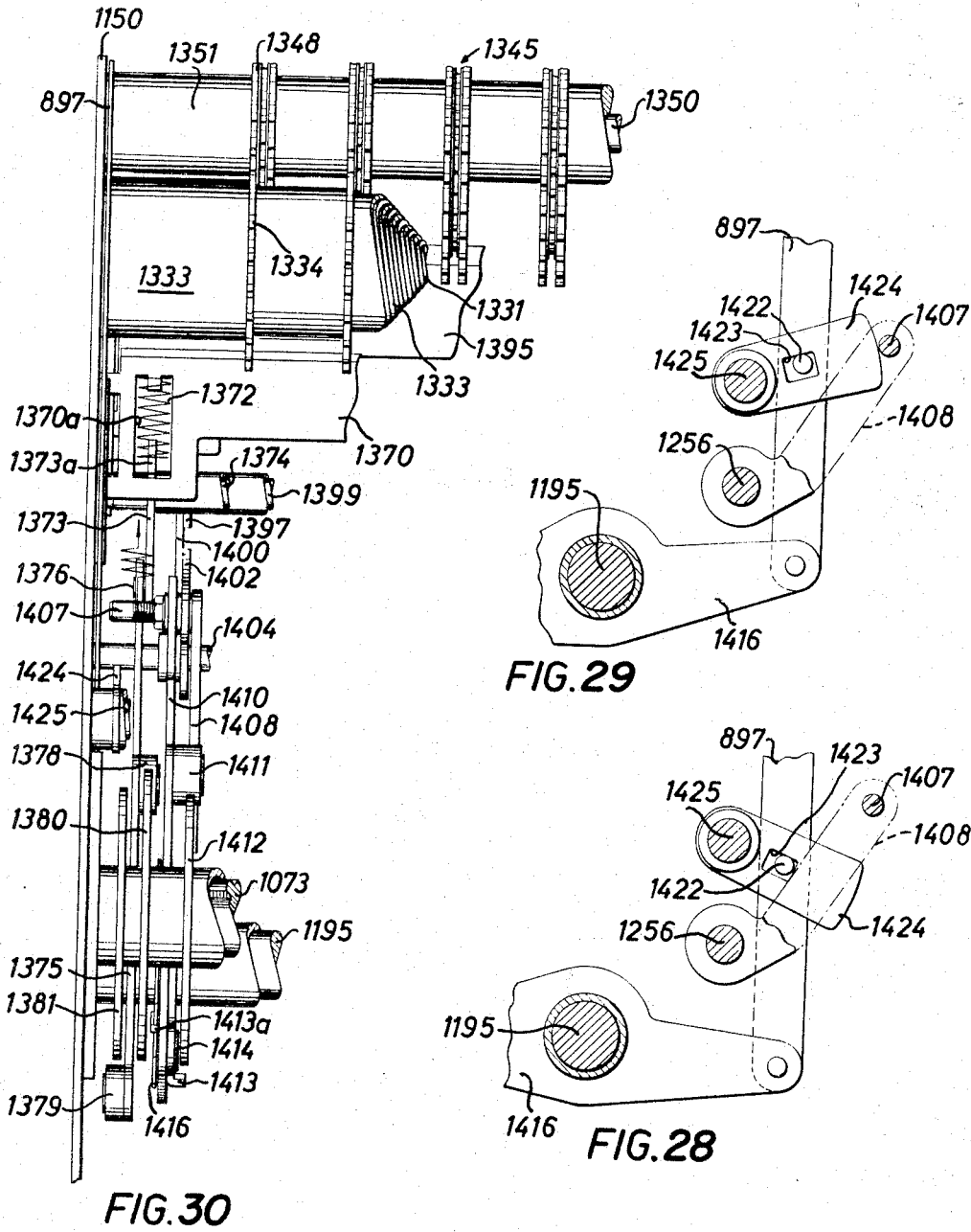

United States Patent Office 3,326,461
Patented June 20, 1967

3,326,461
ACCOUNTING MACHINE INCLUDING IMPROVED DIFFERENTIAL ASSEMBLIES AND CONTROLS THEREFOR
Gosta R. Englund, Stockholm, and Mats E. Mattsson, Sollentuna, Sweden, assignors to Svenska Dataregister AB, Stockholm, Sweden, a corporation of Sweden
Original application Mar. 14, 1962, Ser. No. 179,595, now Patent No. 3,263,915, dated Aug. 2, 1966. Divided and this application Sept. 22, 1965, Ser. No. 489,161
Claims priority, application Sweden, Mar. 17, 1961, 2,839/61
16 Claims. (Cl. 235—11)

This invention relates to an accounting machine and more particularly, to a cash register including new and improved differential and indicating means. This application is a division of pending application No. 179,595, now Patent No. 3,263,915, filed Mar. 14, 1962.

In recent years, it has become desirable in most businesses, especially in retail merchandising establishments, to collect a considerable volume of data relating to the sale of goods or services in order to provide a more accurate evaluation of a business. Although this can be done in a number of ways, the desired information often is most easily acquired at the point-of-sale in a retail store. Since the cash register is frequently the only accounting machine in use at the point-of-sale, a considerable amount of information can be collected and stored by increasing the data accumulating capacity of the cash register and this data can be made more useful by automatically programming the cash register to handle the input data in a manner suited to the accounting practices of the store. However, because of the different quantities, types and forms in which data is used in different businesses, the cash register should provide programming means and data collecting and storing means that are quite flexible to permit a basic cash register construction to be used in widely varying applications.

Accordingly, one object of the present invention is to provide a new and improved accounting machine.

Another object is to provide a cash register including new and improved means for entering, storing, indicating and recording data.

Another object is to provide an accounting machine including new and improved means for controlling the actuation of differentially settable elements therein.

A further object is to provide an accounting machine including means for selectively varying the times during a cycle of operation of the machine at which the differential elements are actuated.

A further object is to provide an accounting machine in which a group of differential elements can be selectively rendered effective or ineffective to operate an accumulator.

Another object is to provide a cash register in which the storage capacity is not reduced even though some of the differential elements used with certain orders of the accumulator are actuated during selected operations of the cash register only to supply data to an indicating assembly.

A further object is to provide an accounting machine including new and improved means for suppressing zeros appearing to the left of the most significant digit in a number.

Another object is to provide an accounting machine in which zeros are inserted in proper positions following the setting of an indicating assembly by a plurality of differential assemblies.

A further object is to provide a cash register in which zeros suppression is accomplished without movement of the differential elements used to control the setting of an indicating assembly.

Another object is to provide an accounting machine in which the concurrent or sequential movement of a pair of differential elements to complementary positions is automatically controlled during each cycle of operation of the machine in accordance with the mode of operation for which the machine has been conditioned.

Another object is to provide an accounting machine including novel means for adjusting the free movements of a pair of levers used to actuate a pair of differential elements to complementary positions.

Another object is to provide an accounting machine including new and improved means for producing repeated entries of data items into an accumulator under the control of an indicating assembly.

Another object is to provide an accounting machine having control means for selectively locking an indicating assembly during certain modes of operation of the machine to permit differential actuators to be set under the control of the indicating assembly.

A further object is to provide an accounting machine including a new and improved transfer gear and shaft assembly for permitting the display of data supplied by a differential means in any desired arrangement or order.

A further object is to provide an accounting machine in which concentrically arranged tubular output shafts are mounted on split resilient bearings to permit the replacement or assembly of the bearings while the shafts are maintained in assembled relation.

Many other objects and advantages of the present invention will become apparent from considering the following detailed description in conjunction with the drawings in which:

FIGURE 1 is a perspective view of a cash register embodying the present invention;

FIGURES 2A and 2B form a side sectional view of the cash register with the housing removed;

FIGURES 3A and 3B form a rear elevational view of the cash register with the housing removed;

FIGURE 4 is a top view of the keys in a keyboard assembly for the cash register;

FIGURES 5A and 5B form a detailed view of a differential assembly controlled by a bank of selector keys;

FIGURES 6A and 6B, when placed side-my-side, form a detail view of the mode of operation differential assembly;

Figure 13:
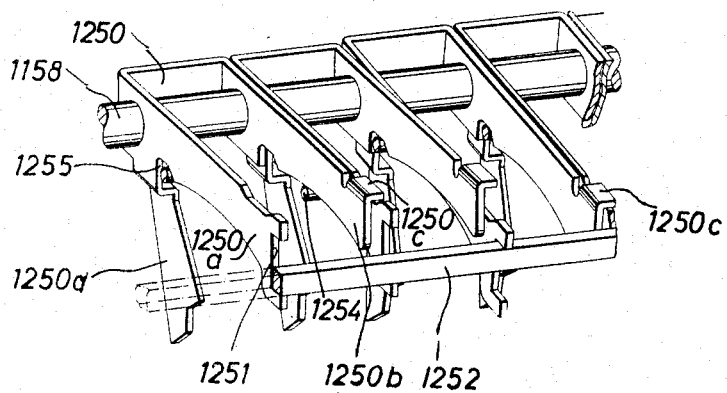
Figure 8:
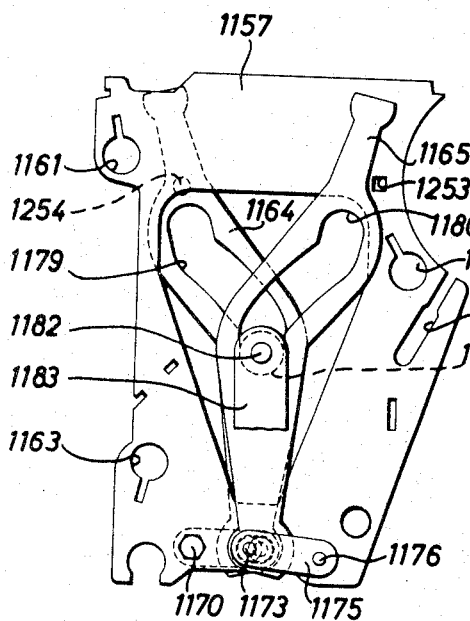
FIGURE 8 is a detail view of the actuating means illustrated in FIGURE 7 which is shown in a normal position.
Figure 16:
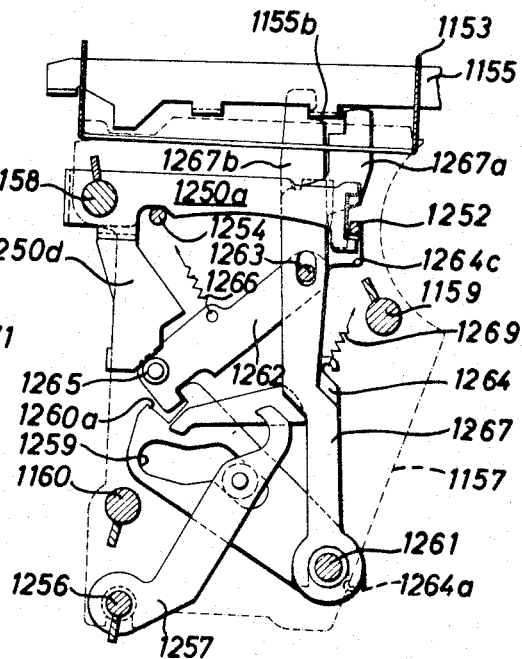
Figure 14:
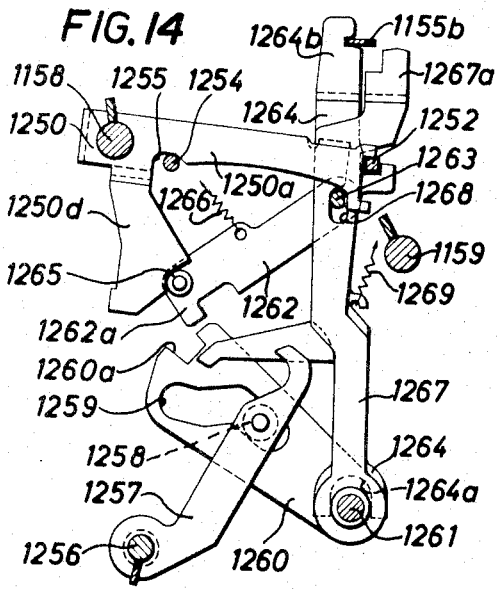
Figure 15:
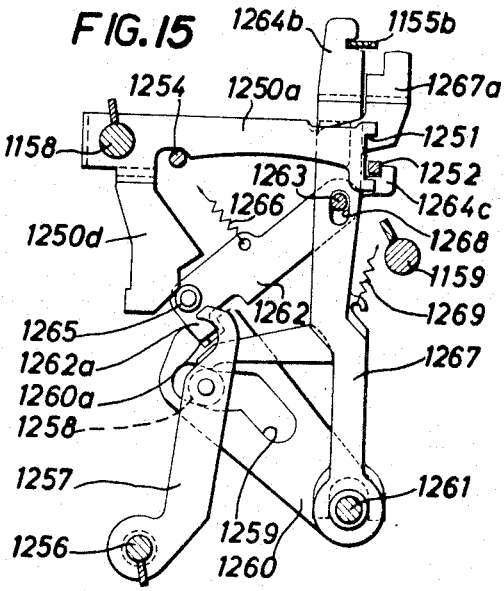
Figure 17:
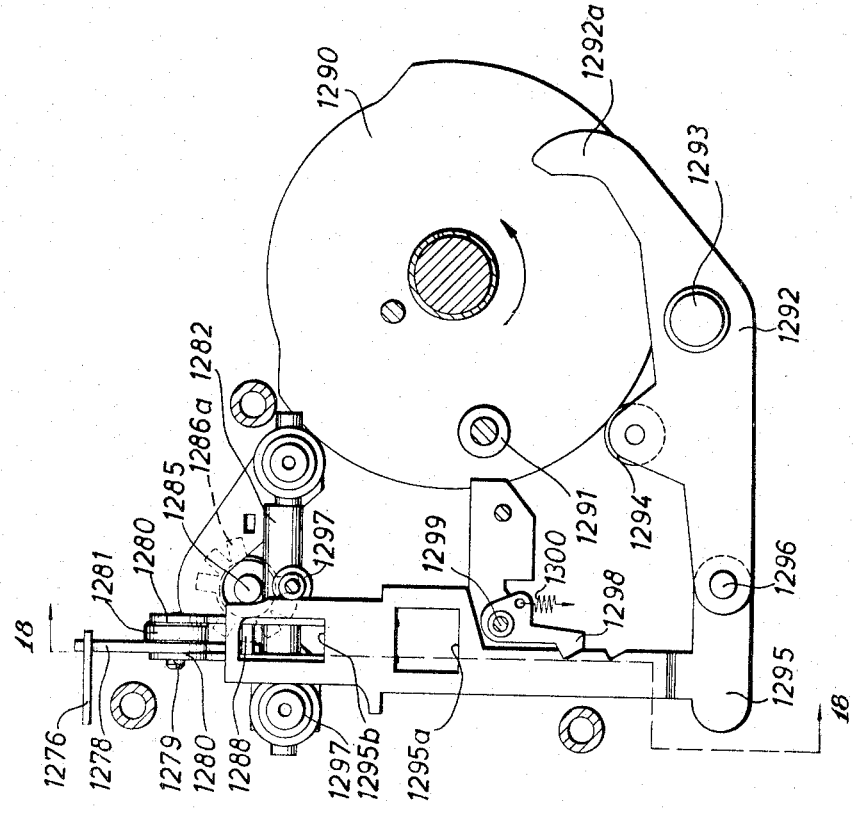
Figure 18:
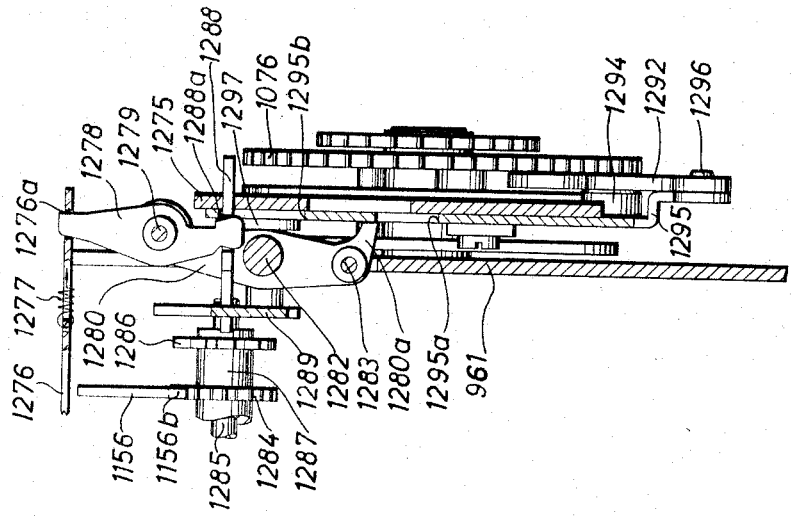
Figure 19A:
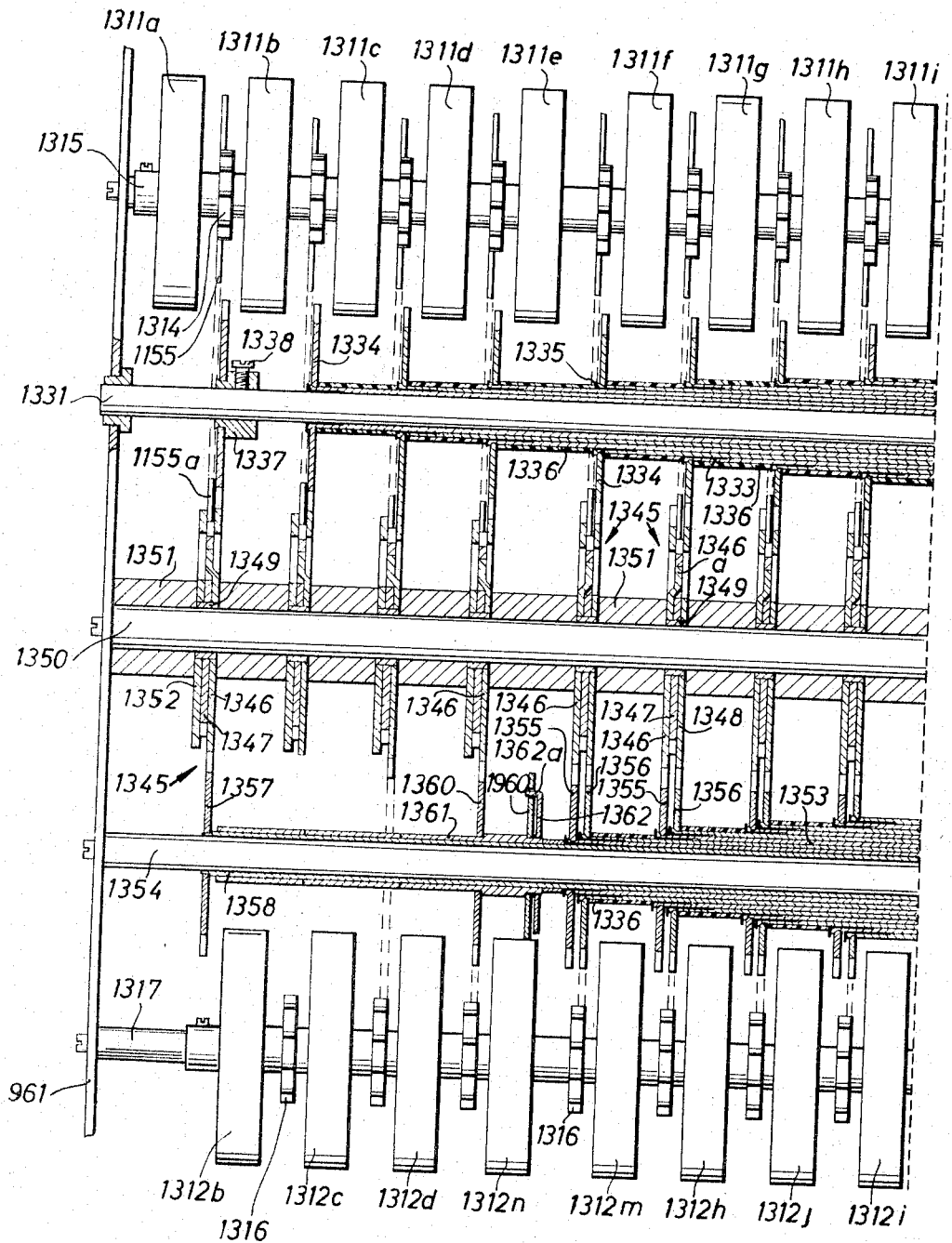
Figure 19B:
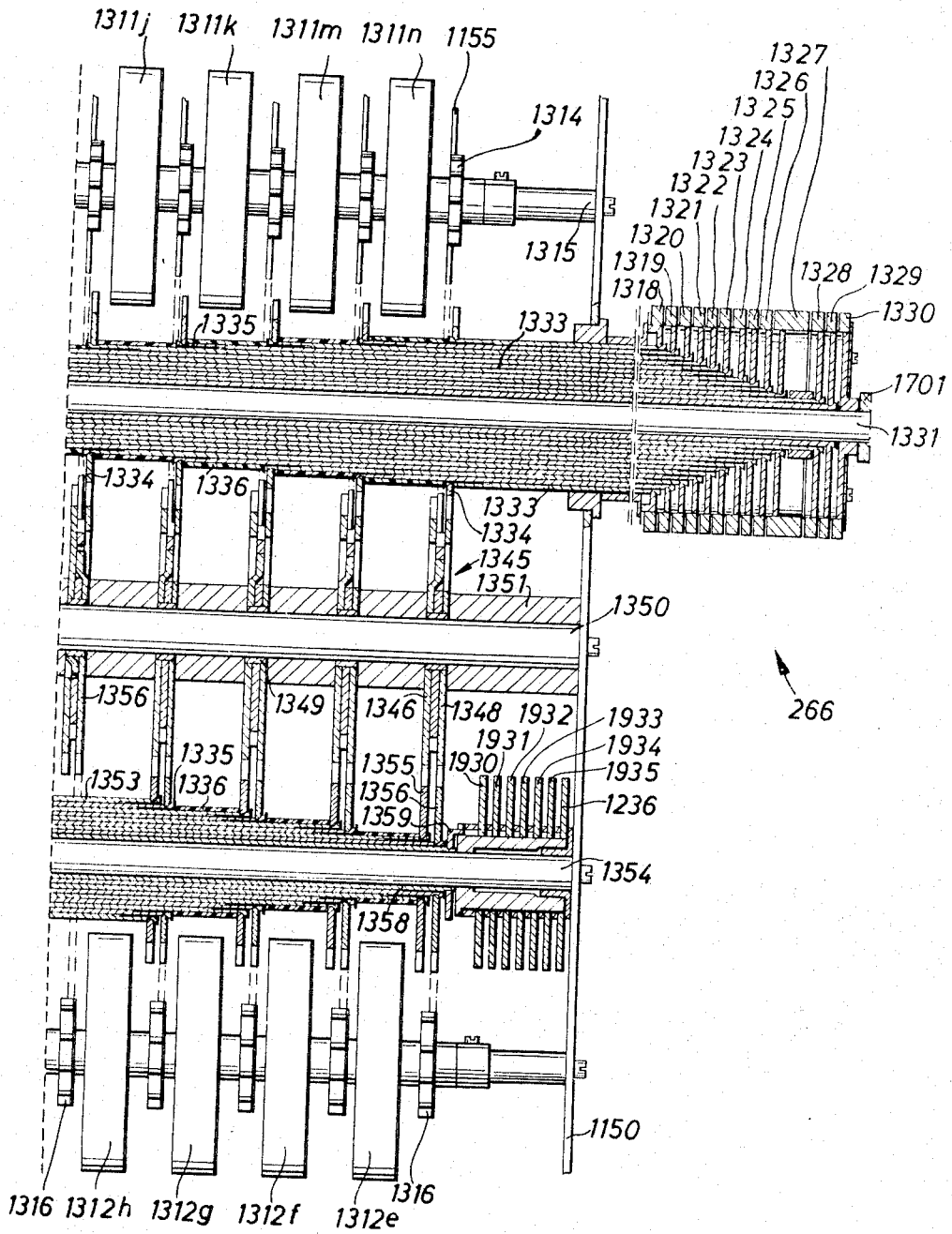
Figure 31:
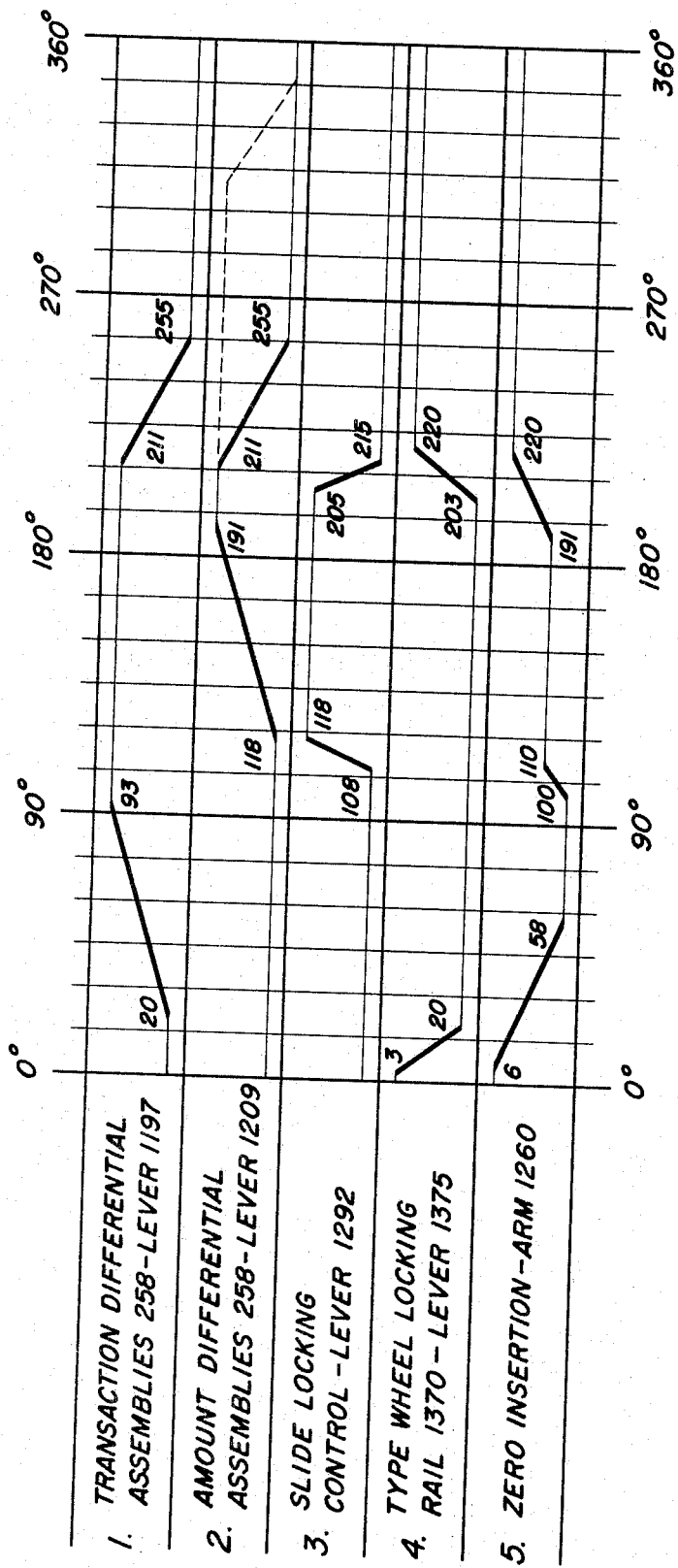

FIGURE 13, appearing on the same sheet as FIGURES 5 and 6, is a perspective view of a portion of a control mechanism included in the differential assemblies for suppressing zeros to the left of the most significant digit;

FIGURE 14, which appears with FIGURES 15 and 16 on the same sheet as FIGURE 8, is a detail view of the normal position of the control means in one denominational order for suppressing zeros;

FIGURE 15 is a view similar to FIGURE 14 showing the control mechanism in an actuated position;

FIGURE 16 is a view similar to FIGURES 14 and 15 showing the control mechanism in an operated position following the completion of a cycle of operation of the cash register;

FIGURE 17 is a detail view in partial section of a slide locking control means shown in normal position;

FIGURE 18 is a sectional view taken along line 18—18 in FIGURE 17;

FIGURES 19A and 19B, when placed side-by-side, form a schematic illustration of an indicating assembly provided in the cash register;

FIGURE 20 is a detail view of a mechanism for aligning and locking certain components of the indicating assembly;

FIGURE 21 is an enlarged fragmentary view of a portion of the mechanism in FIGURE 20 shown in normal position;

FIGURE 22 is a view similar to FIGURE 21 illustrating the locking means in an actuated position;

FIGURE 23 is a detail view of a repeat control assembly by which identical items can be repeatedly entered into the cash register under the control of the indicating assembly, the repeat control assembly being shown in normal position;

FIGURE 24 is a fragmentary view showing the apparatus illustrated in FIGURE 23 in an operated position;

FIGURE 25 is a detail view showing a portion of the repeat control assembly in a normal position;

FIGURE 26 is a view similar to FIGURE 25 illustrating the repeat control means in an actuated position when the cash register is not conditioned for repeat operations;

FIGURE 27 is a view similar to FIGURE 25 showing the control means in an actuated condition when the cash register is conditioned for repeated entries;

FIGURE 28 is a fragmentary view of another portion of the repeat control assembly shown in a normal position;

FIGURE 29 is a view similar to FIGURE 28 illustrating the repeat control means in an operated condition when the cash register is conditioned for repeated entries;

FIGURE 30 is a fragmentary front elevational view illustrating the operating means for the aligning and locking means and the repeat control means included in the indicating assembly; and FIGURE 31 is a timing diagram illustrating the various times during a cycle of operation of the cash register at which different components and mechanisms therein are operated.

GENERAL DESCRIPTION

Figure 1:
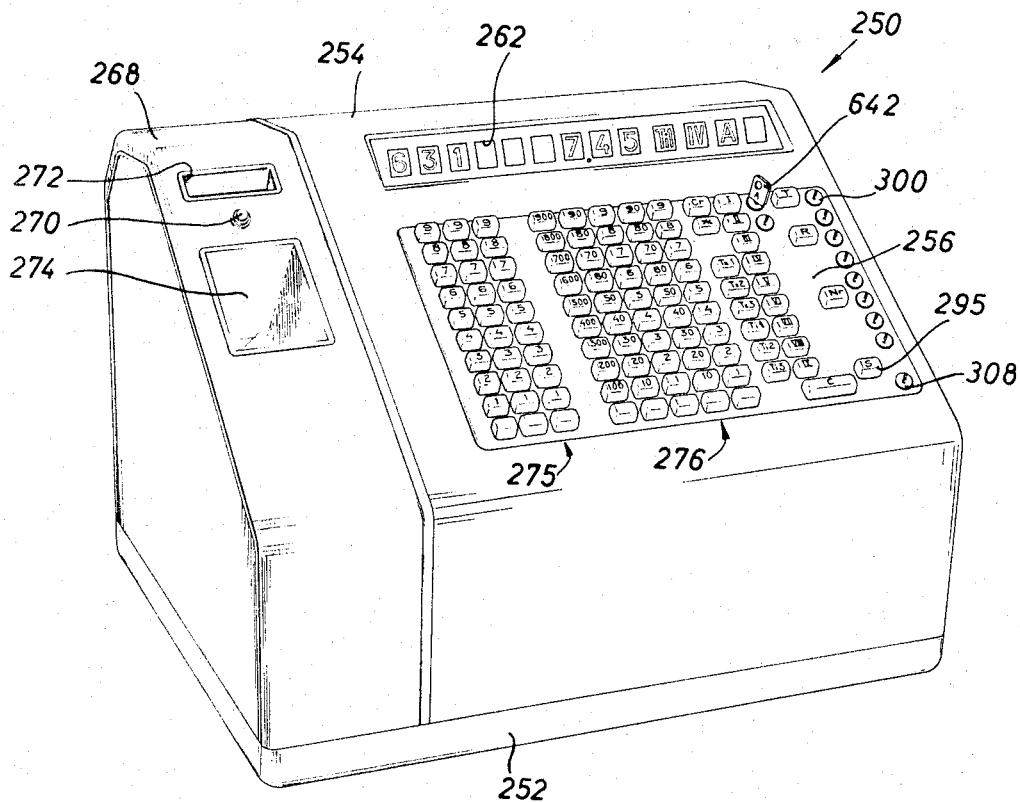

Referring now more specifically to FIGURE 1 of the drawings, there is shown a cash register which is indicated generally as 250 and which embodies the present invention. The cash register 250 includes novel means for entering and storing, recovering, and recording data; for performing arithmetical operations thereon; and for programming the various data handling operations to be performed. Although the cash register 250 can be provided in different forms for use in many different types of commercial establishments, the novel cash register illustrated and described in detail below is adapted for use in cooperative retail sales outlets in which a customer identification or number must be recorded in conjunction with each sales transaction. In addition, since the cash register 250 is designed for use in retail installations in which various local, state and federal taxes may be applicable, the cash register includes means for diverting entered taxable items on which different taxes are due into separate storage means in the cash register and for automatically recovering this information from storage during a totalizing operation to permit the applicable tax amounts to be entered.

In general, the cash register 250 includes a base 252 for supporting the cash register construction on which a main housing 254 enclosing the main portion of the cash register construction is removably mounted. Although the cash register 250 is not shown as including cash drawers, one or more cash drawers can be provided in place of the base 252. The portion of the cash register construction enclosed by the housing 254 includes a unitary keyboard assembly, indicated generally as 256 (FIGURES 1 and 2), by which control and digital data is manually entered into the cash register 250. The keyboard assembly 256 includes various memory means by which this assembly can be manually operated to enter data in a given order into the cash register 250 by controlling the setting of a plurality of differential assemblies indicated generally as 258 (FIGURES 2 and 3). The selective adjustment of the plurality of differential rack assemblies 258 controls the setting of an indicating assembly, indicated generally as 260 (FIGURES 2 and 3), that provides a visible display of various items of information through a plurality of windows 262 provided in the front and back of the housing 254. The keyboard assembly 256, including the memory means provided therein, also controls the selective transfer of information between the differential rack assemblies 258 and an accumulator or totalizer assembly indicated generally as 264 (FIGURE 2).

The cash register 250 also includes a printing or recording assembly, indicated generally as 266 (FIGURE 3), that is selectively supplied with different items of information under the control of the differential assemblies 258 to provide different types of printed records. The printing assembly 266 is disposed within a housing or cover 268 (FIGURE 1) which is mounted on the base 252 and which is detachably secured to the main housing 254 by a latching means including a manually operable element 270. The printing assembly 266 provides receipts severed from a length of paper tape that are discharged through an opening 272 in the housing 268 and a continuous audit tape or strip that is visible through a window 274 in the housing 268.

The cash register 250 also includes a start test assembly, indicated generally as 267 (FIGURE 3A), that is effective to permit an operation of the cash register 250 to be initiated only when the actuated keys represent data that conforms to the program of the cash register. The start test means 267 is placed in operation by the actuation of a selected group of keys in the assembly 256 that possess the start function and operates upon actuation of one of these keys to sense the type of data entry supplied by the keyboard assembly 256. If the type of entry conforms to the program, the cash register 250 is permitted to operate. Alternatively, if the data conditionally entered into the keyboard 256 is not permitted by the program, the attempted start of the cash register 250 is blocked.

KEYBOARD ASSEMBLY 256

The keyboard assembly 256 controls and coordinates all of the operations of the cash register 250 and provides means for manually entering digital and control data into the register. In addition, the assembly 256 includes various memory means which permit the operation of only selected key combinations at different points in a transaction, which control the start test means 267 to permit the cash register 250 to be placed in operation only when correct data is sought to be manually entered, and which control the automatic recovery of certain items of information, such as taxable items, from the accumulator or totalizer assembly 264.

Figure 4:
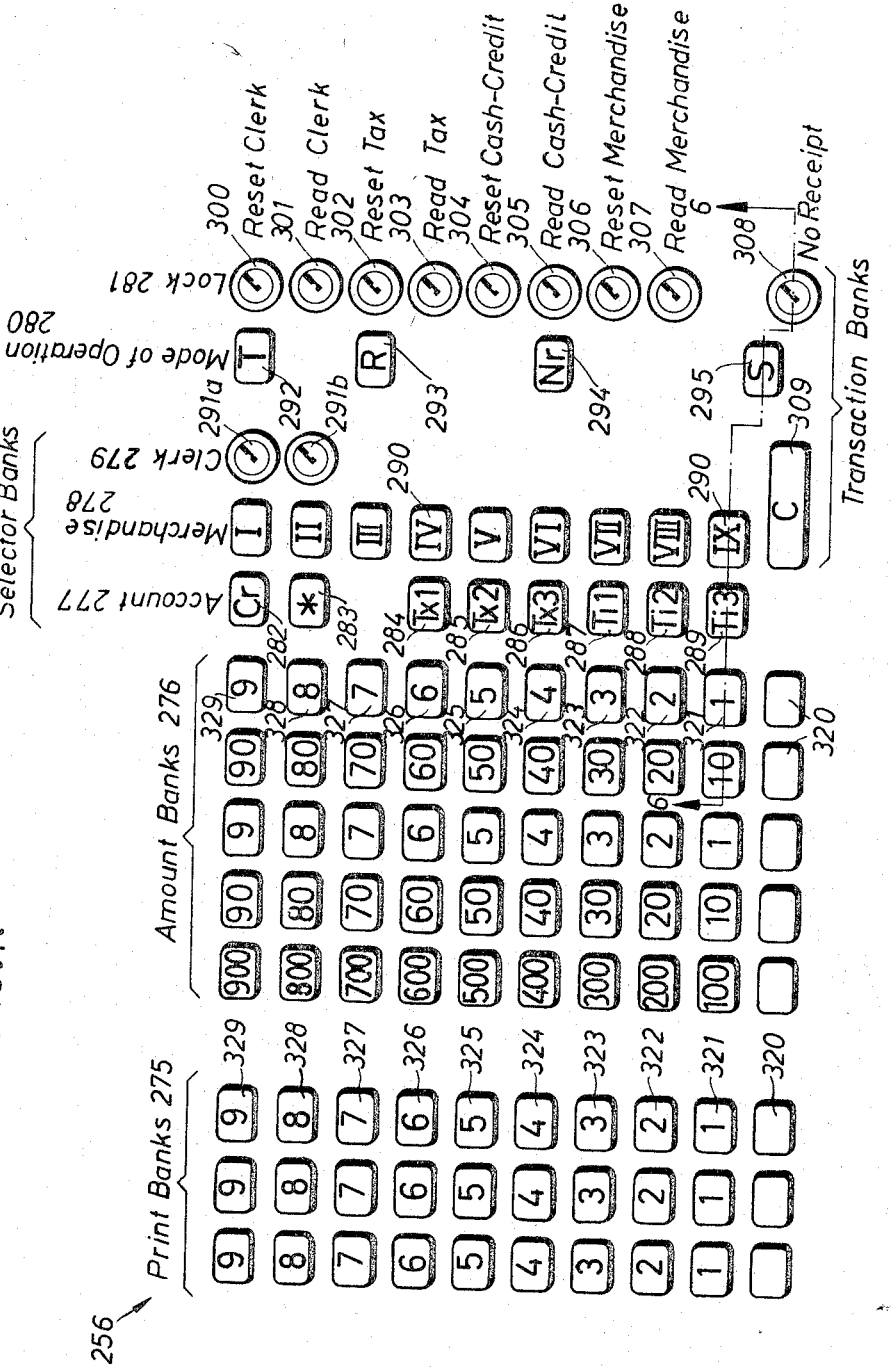

The keyboard assembly 256 (FIG. 4) includes three banks 275 of print keys that are used to enter digital data that is indicated or recorded but is not totalized, such as a numerical designation identifying a sales article. The keyboard assembly 256 also includes five amount key banks 276 that are used to enter digital data, such as amounts or customer numbers, into the cash register 250. Although the amount banks 276 are shown as comprising five banks for entering a five digit number, the accumulating assembly 264 is capable of storing a nine digit number. Thus, the number of amount banks 276 can be expanded, if desirable. Each of the banks 275 and 276 controls a related differential assembly 258.

The keyboard assembly 256 also includes a plurality of transaction banks that are used to enter control information into the cash register 250. The transaction banks include an account bank 277, a merchandise bank 278, and a clerk bank 279, which function as selector banks, a mode of operation bank 280, and a lock bank 281. All of the banks 277–281 except the bank 281 control a selected differential assembly 258. The selector banks 277, 278 and 279 perform the primary function of determining the ones of the totalizers or accumulators in the assembly 264 to which data is directed and from which data is withdrawn. The mode of operation bank 280 selects the type of operation to be performed by the cash register 250, and the lock bank 281 provides means for reading and resetting the accumulators in the assembly 264.

Referring now more specifically to the selector banks, the account bank 277 is effectively or functionally divided into two separate banks, a first of which includes two keys 282 and 283. The credit or charge key 282 is actuated to terminate a series of listing operations in a credit total, and the cash key 283 performs the same function for a cash transaction. The second group or bank in the account bank 277 includes six keys, 284–289, that are used with taxable items. The taxable item keys 287–289 are selectively operated during listing operations to direct amounts on which three different taxes, such as local, state and federal taxes, are applicable to three separate accumulators in the assembly 264. The tax amount keys 284–286 are used to enter three different tax amounts due into three different accumulators in the assembly 264. The account bank 277 also includes a number of automatically operated keys that are selectively actuated under the control of a memory means during a total operation.

The merchandise bank 278 includes nine keys 290. The lower seven keys "III–IX" (FIGS. 1 and 4) are selectively actuated during data entering operations to direct amounts supplied by the banks 276 to different ones of the accumulators in the assembly 264 in accordance with any desired classification, such as type of merchandise, i.e., groceries, meat, produce, etc. The uppermost two keys "I" and "II" provide refund keys for the adjacent keys in the clerk bank 279. The cast register 250 is controlled to provide a first type of repeated identical entry by manually holding a key in the bank 278 depressed.

The clerk bank 279 includes two lock-type keys 291 which are selectively operated to direct amounts entered by the keys in the amount banks 276 into accumulators in the assembly 264 representing two different clerks. The operation of one of these keys also frees the keyboard assembly for operation by releasing a keyboard lock.

The mode of operation bank 280 includes four manually operable keys 292–295 and additional automatically operable keys that are used to control the setting of the mode of operation differential assembly 258 to select the type or mode of operation to be performed by the cash register 250. The key 292 provides manually actuated means for initiating a total operation of the register 250, and the key 295 provides means for manually initiating a subtotal operation. The key 294 is operated when a customer designation or number is to be registered, and the key 293 is actuated when a second type of repeat operation of the cash register 250 is desired. During this second type of repeat operation, a data item previously entered can be repeatedly entered by locking the indicating assembly 260.

The lock bank 281 includes nine lock keys 300–308. The keys 300 and 301 are used for resetting and reading the clerk accumulators in the assembly 264, respectively, and the keys 302 and 303 are used for resetting and reading the tax accumulators in the assembly 264, respectively. The keys 304 and 305 are used for resetting and reading the cash-credit accumulators in the assembly 264, espectively, and the keys 306 and 307 are used to reset and read the merchandise accumulators in the assembly 264, respectively. The key 308 is actuated when the printing assembly 266 is to issue a receipt during a total operation.

The keyboard assembly 256 also includes a key 309 that is actuated when a motor driven correction of the keyboard assembly 256 is required. The actuation of the key 309 renders a drive motor in the cash register 250 effective to restore or release the actuated keys in the assembly 256.

The keyboard assembly 256 comprises a unitary and separately operable structure that is mounted on the supporting fram for the cash register 250 (FIG. 2) and includes a base or lower plate or wall 310 to which a pair of side walls are secured. An apertured top plate 313 through which the plurality of keys extends is secured to the flanged upper edges of the side walls. The keyboard assembly 256 is provided with a separate drive shaft 314 that is driven by and in synchronism with the main shaft of the cash register 250. The drive shaft 314 is rotatably mounted at its opposite ends in the side walls and is connected to a gear that meshes with suitable drive means carried on the main frame of the cash register 250.

The print banks 275 and the amount banks 276, which control the setting of related print and amount differential assemblies 258, are identical and each include a manual correction key 320 and nine keys 321–329 representing the digits "1–9," respectively. Each of the keys 321–329 includes a plastic head portion projecting upwardly through an opening in the cover plate 313. The head portion of each of the keys 321–329 includes a transversely extending slot or opening in which the upper end of a key shaft or stem 331 is slidably mounted. The upper end of each of the key stems 331 is provided with an opening for receiving a compression spring on which the head portion of each of the keys 321–329 rests to provide a yielding or resilient connection between the head portions of each of these keys and the key stems 331.

The stems 331 are slidably mounted in transversely extending slots in the plate 310 at their lower ends and are slidably mounted in similar slots in a frame member 336 that is carried on the frame of the keyboard assembly 256. The lower ends of the key stems 331 are disposed above one of the differential assemblies 258 (FIG. 2) in the main body of the cash register 250 so that when a given one of the keys 321–329 is depressed, the related key stem 331 moves downwardly to place its lower end in the path of movement of two differential elements in the assembly 258. This provides means for arresting movement of the differential assembly 258 in a position corresponding to the value represented by the depressed key.

To provide means for retaining the keys 321–329 in a depressed position, a latch supporting plate 337 is mounted adjacent the key stems 331 in each of the banks 275 and 276. The plate 337 includes spaced projections along its upper and lower edges that are received within corresponding openings in the base plate 310 and the plate 336.

A plurality of detent elements 338 having U-shaped lower ends interposed between the upper surface of the base plate 310 and positioning notches formed in the lower edge of the plate 337 including angularly formed upper end portions that extend through openings 340 in the plate 337. An elongated compression spring 341 secured at its opposite ends to a pair of lugs on the plate 337 is positioned within the offset end portions to resiliently bias the detent elements 338 toward the adjacent edges of the key stems 331. When one of the stems 331 is depressed, a projection on the stem cams against the end portion on the element 338 to move the adjacent element 338 to permit the key stem 331 to move downwardly. When the projection passes beyond the end portion, the spring 341 displaces the detent 338 to hold the operated key in a depressed condition.

The keys 321–329 in the banks 275 and 276 are flexible so that the depression of one of these keys prior to the initiation of a cycle of operation of the cash register 250 and following the actuation of another key in the same bank results in the release of the previously depressed key. To accomplish this, the keys of the banks 275 and 276 are linked by coupling elements (not shown) providing a flexible key coupling assembly of the type shown in the copending application.

An operated or depressed one of the keys 321–329 in the banks 275 and 276 can also be restored to a normal condition by manually actuating the related correction key 320. The correction key 320 includes a correction key stem 355 that is slidably mounted in the frame 336 at its lower end and includes a projection at its upper end that is received within a slot in the lower end of the button or head of the key 320.

Depression of the key 320 controls the related coupling assembly to restore any depressed key in the associated bank to its normal condition. To provide motor driven key restoring operations, an arm 390 secured to a shaft 391 overlies a lug on the key stem 355. The keyboard drive means pivots the shaft 391 in a clockwise direction to depress the stem 355 and restore any operated keys to their normal position.

Each of the print banks 275 and the amount banks 276 in the keyboard assembly 256 includes a zero stop means that is effective during certain modes of operation of the cash register 250 to arrest the differential assemblies 258 in a zero position when the keys in the associated banks 275 and 276 have not been operated. In general the zero stop means comprises a stop element or automatically actuated key stem that is normally retained in an ineffective position. This stop element is freed for movement to a depressed or effective position at the beginning of a cycle of operation of the cash register, and this detent element tests whether or not a key in the bank has been actuated. If no keys have been actuated, the stop element moves to a depressed position in which it is effective to prevent movement of the related differential assembly 258. Alternatively, if a value representing key has been actuated, the zero stop key stem is retained in an ineffective position.

At this point in the cycle of operation of the cash register 250, a detecting means tests to determine whether the mode of operation being performed is one in which the differential assemblies 258 associated with the banks 275 and 276 are to be set under the control of the keyboard assembly 256 or are to be set under the control of other means, such as the accumulator assembly 264. If the differential assemblies 258 are to be set under the control of the keyboard assembly 256, the zero stop key stems remain in their effective or ineffective positions in accordance with the selective actuation of the keys in related banks 275 and 276. Alternatively, if the selected mode of operation requires the differential assemblies 258 to be set under the control of the accumulator assembly 264, for instance, the zero stop control means automatically restores all of the zero stop elements to an ineffective position prior to the actuation of the differential assemblies 258.

The zero stop means in each of the print banks 275 and the amount banks 276 include a zero stop detent element or key stem 420 that is slidably mounted in the frame elements 336 and 310. The key stem 420 also includes an offset portion that is slidably mounted in the frame element 336 to be disposed above an arm on the coupling link associated with the key 329. A tension spring 421 connected between a projecting portion on the keyboard frame and an offset portion at the upper end of the key stem 420 provides means for resiliently biasing the zero stop key stem 420 downwardly.

To provide means for selectively rendering the key stem 420 effective and ineffective, a plate 422 secured to a shaft 423 is provided with a plurality of projecting lugs which are received within openings formed in the upper ends of the key stems 420. The shaft 423 is pivotally mounted on the frame element 336 by a pair of brackets 425 and is secured at one end to an arm 426 carying a cam follower roller. The tension springs 421 act on the key stems 420, the plate 422, and the shaft 423 to bias the cam follower roller into engagement with the upper surface of a control slide 428 that is slidably connected to one side wall of the keyboard frame.

The upper edge of the slide 428 includes a lower surface and an upper surface. In the position of the slide 428 when the cash register 250 is in a normal condition between cycles of operation, the cam follower roller engages the upper surface on the slide so that the plurality of zero stop elements 420 are secured in an elevated position (FIG. 2) against the action of the plurality of tension springs 421. When the slide 428 is shifted to the right, the cam follower roller engages the lower surface, and the shaft 423 is pivoted in a counterclockwise direction so that the lugs on the plate 422 are lowered within the openings in the key stem 420.

If one of the keys 321–329 in the bank associated with a particular zero stop element 420 has been actuated, the arm on the end coupling link engages the offset portion on the stem 420 and prevents the zero stop element 420 from moving downwardly under the influence of the tension spring 421. Alternatively, if one of the keys in the associated bank has not been operated so that the coupling link associated with the last key 329 in the bank remains in its normal position, the tension spring 421 lowers the associated zero stop stem 420 to a position in which it prevents movement or operation of the associated differential assembly 258.

When the slide 428 is moved to the left to the normal position shown in FIG. 2, the engagement of the cam follower roller with the upper surface pivots the arm 426 and the shaft 423 in a clockwise direction so that the lugs on the plate 422 engage the upper edges of the openings in the key stems 420 to restore these stems against the force of springs 421 to their normal positions. The slide 428 is restored to its normal position before the operation of the differential assemblies 258 in those modes of operation selected by the bank 280 in which the assemblies 258 are not to be set by the keyboard assembly 256. Alternatively, the slide 428 is restored to its normal position shown in FIG. 2 following the setting of the differential assemblies 258 in those modes of operation in which the assemblies 258 are to be set under the control of the keyboard assembly 256. Suitable means for controlling the shifting movement of the slide 428 are shown and described in detail in the copending application.

The selector or transaction banks and the mode of operation bank of the keyboard assembly 256 also include key stems manually or automatically operated to depressed positions in which they are effective to control the setting of the related transaction or mode of operation differential assembly 258. The details of these constructions as well as the manner of operation thereof are set forth in the copending application. This copending application also illustrates and describes further details of the print and amount banks of the keyboard assembly 256.

ACCUMULATOR ASSEMBLY 264

The accumulator assembly 264 (FIG. 2) is operated by the plurality of amount differential assemblies 258 during listing operations to store items of information received from the amount banks 276. During reading operations, the accumulator assembly 264 supplies information through the amount differential assemblies 258 to the indicating assembly 260 and the printing assembly 266, and this information is subsequently returned to storage in the accumulating assembly 264. During resetting operations, the data stored in the accumulator assembly 264 is removed therefrom and transferred through the amount differential assemblies 258 to the indicating assembly 260 and the printing assembly 266. In the illustrated embodiment of the cash register 250, the accumulator assembly 264 includes five totalizer or accumulator lines or shafts providing a customer number register, an account accumulator group, a merchandise accumulator group, a clerk accumulator group, and an itemizing accumulator or itemizer, considered from right to left in FIG. 2.

The operation of the accumulator assembly 264 is selectively controlled by the transaction banks of the keyboard assembly 256 through an accumulator control unit or means. The accumulator control unit controls the times at which the plurality of accumulator lines are moved into and out of engagement with the amount differential assemblies 258 to control the performance of listing, reading or resetting operations. In addition, the control unit is controlled by the account bank, the merchandise bank and the clerk bank to select different ones of the plurality of accumulating means provided in each of the accumulator groups of engagement with the amount differential assemblies 258.

The accumulator groups are mounted between a left frame element or wall 1436 and a similar right frame element or wall which are supported beneath the differential assemblies 258 and between the side walls of the main frame of the cash register 250. The side walls including the walls 1436 are secured together in a spaced relation by a plurality of connecting shafts 1438. Each of the accumulator groups includes a shaft 1439 carrying a number of groups of uniformly spaced accumulator gears or wheels 1451 that is equal to the number of individual accumulators provided in each accumulator group. Since the cash register 250 is provided with nine amount differential assemblies 258, each complete set of accumulator gears on the shafts 1439 includes nine individual accumulator gears 1451 each representing a separate denominational order. The accumulator gears 1451 of each set or group are coupled by suitable carry means 1476 of the type shown and described in detail in the copending application referred to above.

The accumulator control unit raises and lowers one or different combinations of the shafts 1439 to selectively couple the gears 1451 with the toothed portions 1151b on the slides 1151 in read, reset, or list timing to control the transfer of information between the accumulator assembly 264 and the amount differential assemblies 258. The accumulator control unit selects different sets of gears 1451 or different individual accumulators within a selected accumulator group by axially shifting the shafts 1439 under the control of the settings of the transaction differential assemblies 258.

The detailed construction of the accumulator assembly 264 as well as that of the printing or recording assembly 266 is set forth in the copending application referred to above.

DIFFERENTIAL ASSEMBLIES 258

The cash register 250 includes nine amount differential assemblies 258 and four transaction differential assemblies 258 which are driven by the main shaft 1073 of the cash register 250 to different settings determined by the actuated keys in the keyboard assembly 256 to control the entry of information into the cash register 250 and to control the performance of various functions thereby. During listing operations, five of the amount differential assemblies 258 are directly controlled by the keys in the five amount banks 276 to supply digital data to five orders of the accumulator assembly 264, the printing assembly 266, and the indicating assembly 260, the remaining four higher orders of the accumulator assembly 264 being capable of receiving data from the four lower orders by carry operations. During listing, the keys in the three print banks 275 directly control the three highest order differential assemblies 258 to supply digital data to only the printing assembly 266 and the indicating assembly 260. During reading or resetting operations, the nine amount differential assemblies 258 are controlled by the accumulator assembly 264 to supply digital information to the printing assembly 266 and the indicating assembly 260. The single transaction or mode of operation differential assembly 258 controlled by the keys in the transaction banks 280 and 281 conditions the cash register 250 for different types or modes of operation and the three transaction differential assemblies 258 controlled by the keys in the banks 277–279 select different accumulators in the accumulator assembly 264 as well as provide different auxiliary controls over the operation of the cash register 250.

In addition to these features, the differential assemblies 258 and the control and driving means associated therewith are capable of providing a number of additional features. As indicated above, the driving or actuating means for the three highest order differential assemblies 258 is such that the keys in the print banks 275 can be used during listing operations to supply information to the indicating assembly 260 and the printing assembly 266 during the same cycle of operation in which digital data is carried into the related orders of the accumulators under the control of actuated keys in the amount banks 276. The differential assemblies 258 also include means for suppressing zeros in the indicating assembly 260 appearing to the left of the most significant digit and for inserting zeros to the right of the most significant digit. In addition, the control and actuating means for the differential assemblies 258 are so constructed that when the differential assemblies are controlled by the accumulating assembly 264 during reading and resetting operations, the setting of the differential assemblies 258 is accomplished without subjecting the accumulator assembly 264 to excessive mechanical stresses.

Slide or rack construction

The differential assemblies 258 included in the cash register 250 are of the positively driven type shown and described in detail in United States Patent Nos. 3,040,978 and 3,103,309. In general, each assembly 258 includes an accumulator slide or rack and a complementary slide or rack that are mounted for oppositely directed translatory movement beneath the keyboard assembly 256. The upper edges of these two racks are provided with spaced projections which engage opposite sides of a depressed key shaft or stem to locate the slides in a position corresponding to the depressed key. In operation, the accumulator slide is moved in one direction to engage one side of a depressed key shaft and the complementary slide is moved in an opposite direction so that one of the projections on this slide engages the opposite side of the depressed key stem to set the complementary slide in a position complementary to the arrested position of the accumulator slide. An indicator slide or rack loosely coupled to the complementary and accumulator slides is set in different positions in accordance with settings of the accumulator and complementary slides and remains in this setting between successive cycles of operation of the cash register 250. Information is transmitted to and removed from the accumulator assembly 264 by selectively moving one or more accumulators into engagement with the toothed portion of the accumulator slide. The differential assemblies 258 are supported on the main frame of the cash register 250 between the right wall 961 (FIG. 3A), considered from the front of the register 250, and a left supporting wall 1150 (FIG. 3B) by suitable supporting shafts and bars to be disposed in an inclined position immediately beneath the lower wall 310 (FIGS. 2A and 2B) of the keyboard assembly 256.

Figure 2A:
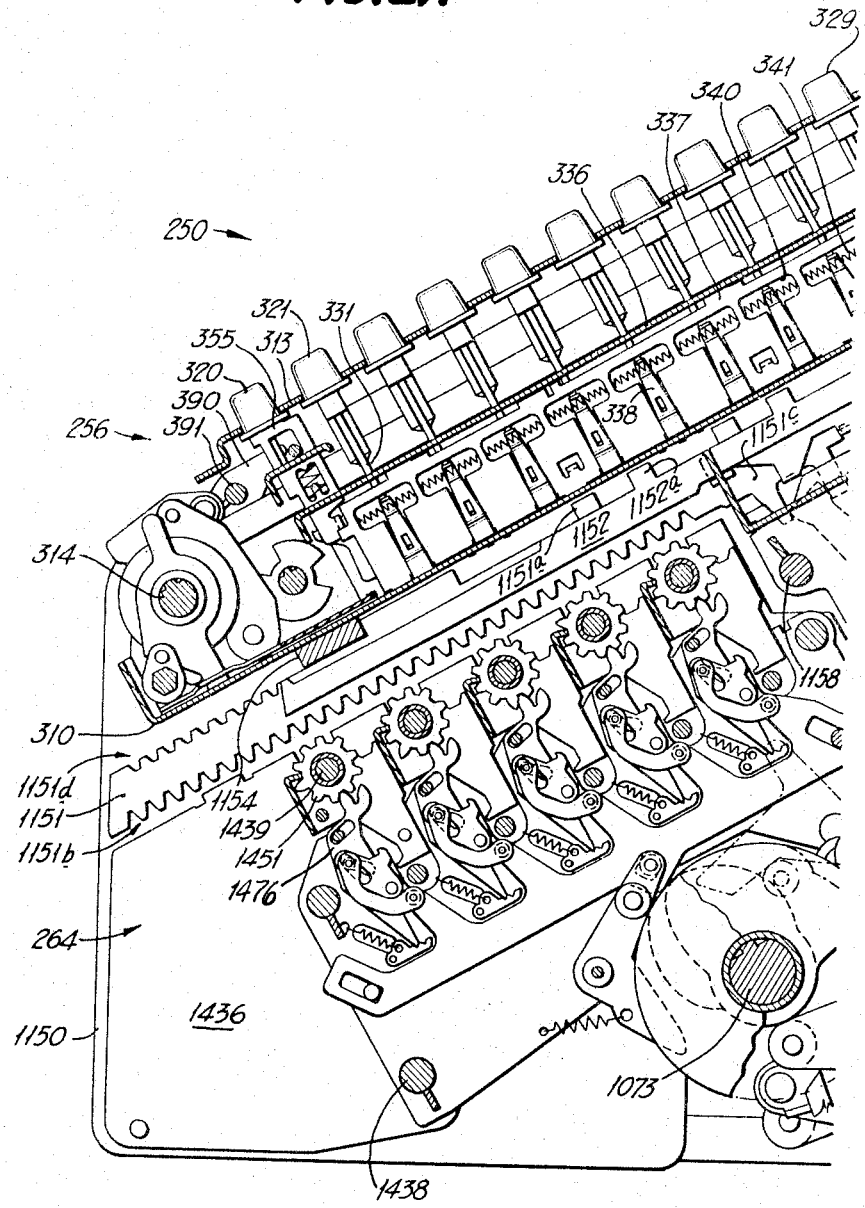
Figure 2B:
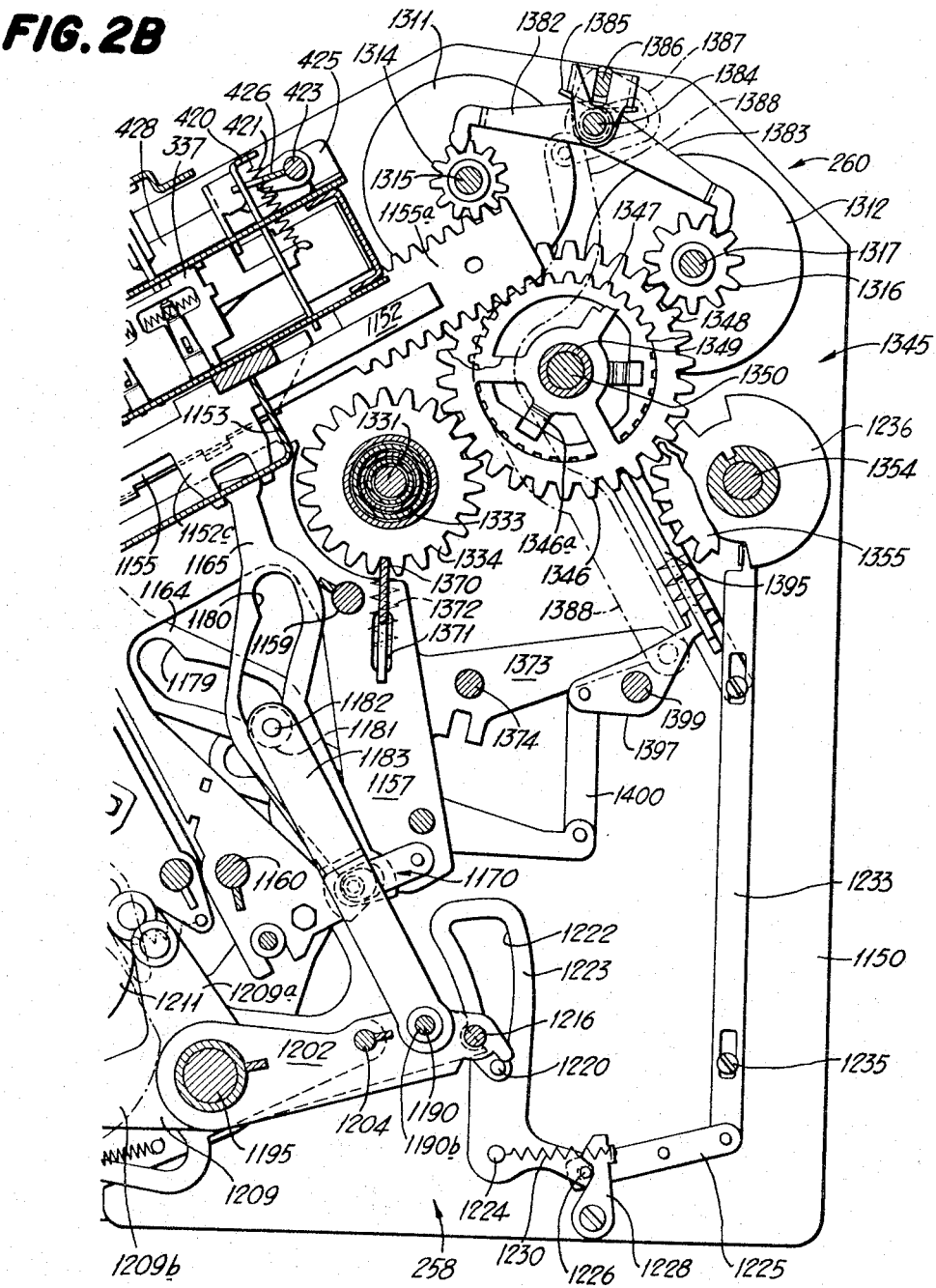
Figure 3A:
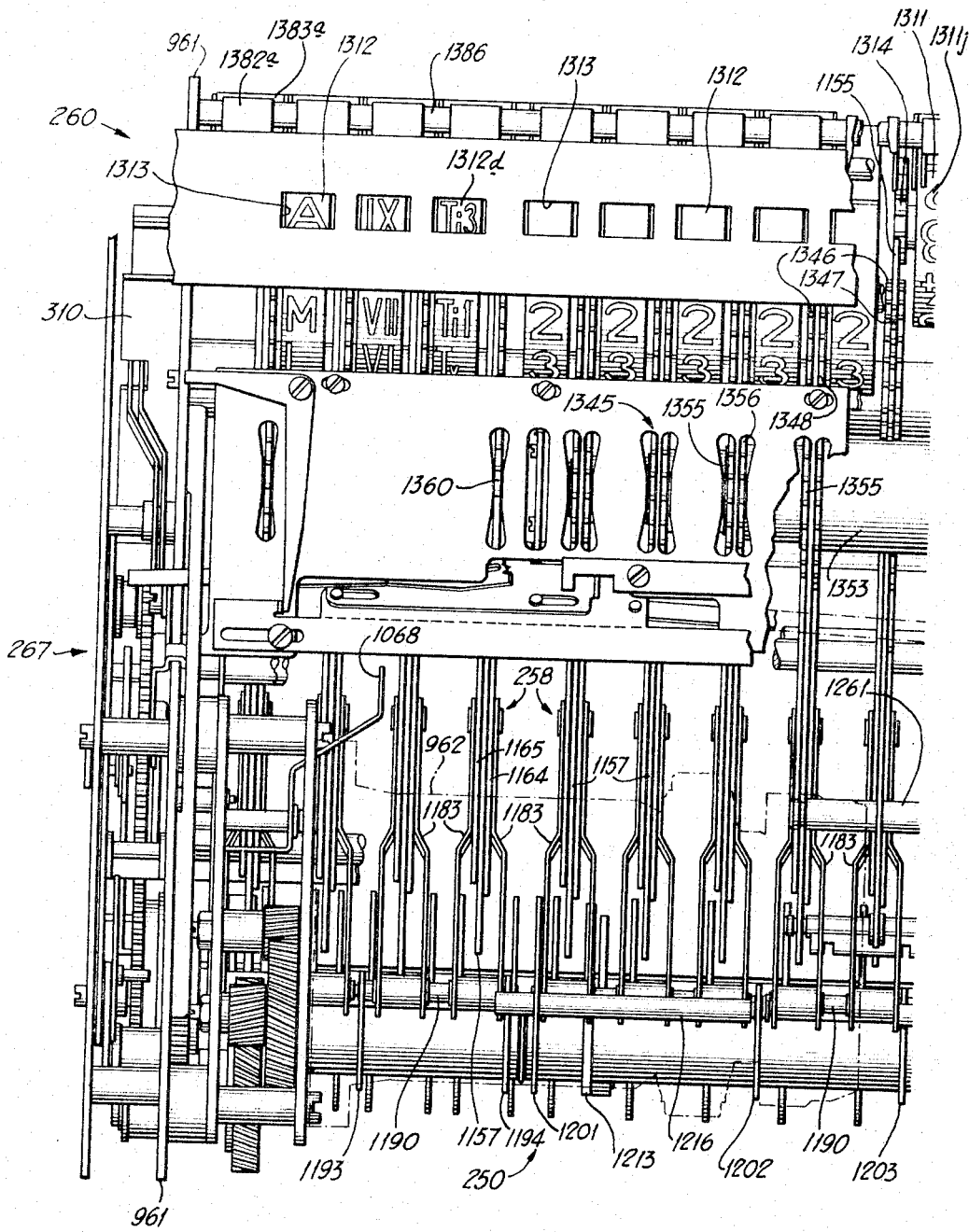
Figure 3B:
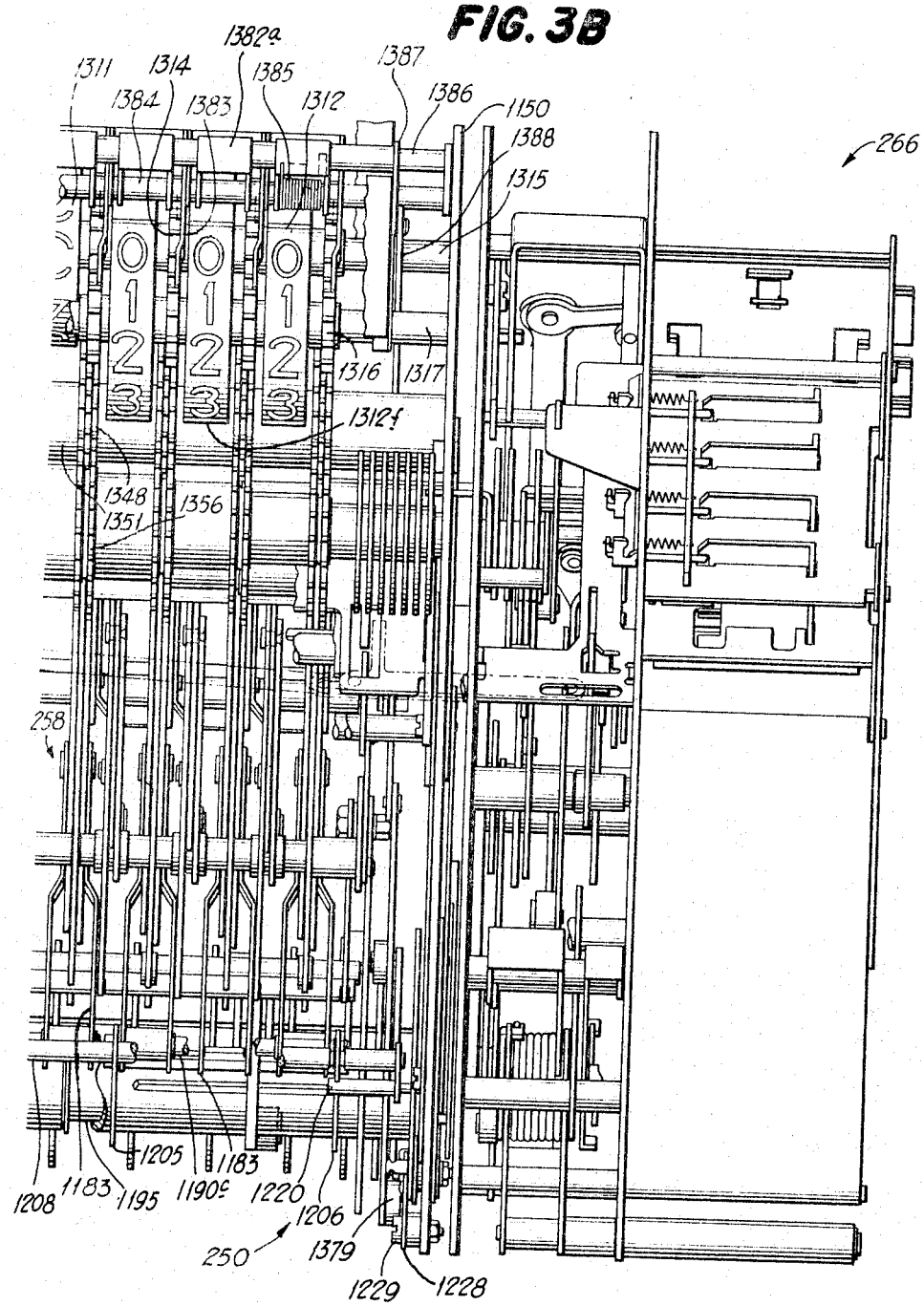

(1) *Amount differential assemblies 258.*—One of the differential assemblies 258 controlled by the print banks 275 and the amount banks 276 is illustrated in FIGS. 2A and 2B of the drawing. This differential assembly includes an accumulator slide or rack 1151 and a complementary slide or rack 1152 that are slidably mounted for movement parallel to each other in suitable slots formed in a U-shaped supporting element 1153 that extends between and is secured to the side walls 961 and 1150. The upper edges of the slides 1151 and 1152 are provided with projecting portions 1151a and 1152a that are disposed immediately below the lower wall 310 of the keyboard assembly 256 and are adapted to be moved into engagement with opposite sides of the depressed portion of a key shaft 331. Projections adjacent the ends of these two slides are adapted to be moved into engagement with two bars 1154 that extend between and are secured to the side walls 961 and 1150 to determine the normal positions of the slides 1151 and 1152 shown in FIGS. 2A and 2B. The left-hand lower edge of the accumulator slide or rack 1151 is provided with a toothed portion 1151b for engaging gears in the accumulator assembly 264. The upper left-hand edge of the rack 1151 includes a toothed portion 1151d that is used when the setting of the assembly 258 is controlled by the accumulator assembly 264.

To provide a means for controlling the setting of the indicator assembly 260 and the printing assembly 266 in dependence on the setting to which the accumulator slide 1151 and the complementary slide 1152 are moved, an indicator slide or rack 1155 is slidably mounted in slots formed in the supporting member 1153 and is disposed between the slides 1151 and 1152. The indicator slide 1155 is loosely coupled to the accumulator slide 1151 and the complementary slide 1152 by suitable projections formed on spaced portions of the slide 1155 that engage shoulders or projections formed on the slides 1151 and 1152. The right end portion of the indicator slide 1155 is provided with toothed portions 1155a along its upper and lower edges for controlling the setting of the indicator assembly 260 and the printing assembly 266.

When the cash register 250 is placed in operation, the accumulator slide 1151 is moved to the right to a position determined by a depressed key shaft 331, the accumulator assembly 264, or the rack 1155 on indicator repeat operations, and the complementary slide 1152 is moved to the left to a position complementary to that of the accumulator slide 1151. During this movement, except on indicator repeat operations, the projections on the indicator slide 1155 are engaged by the slides 1151 or 1152 to move the indicator slide 1155 from its previous position to a position corresponding to the present setting of the slides 1151 and 1152. When the differential assembly 258 is restored to its normal position, the complementary slide 1152 is moved to the right to a normal position and the accumulator slide 1151 is moved to the left to a normal position. The indicator slide 1155 remains in the adjusted setting inasmuch as the two slides 1151 and 1152 move away from engagement with the projections on the indicator slide 1155. Thus, when the differential assembly is actuated to its next setting, the indicator slide 1155 is only moved from its previous setting to the next setting and is not returned to a zero position and operated to a new setting during each cycle of operation of the cash register 250.

Figure 5A:
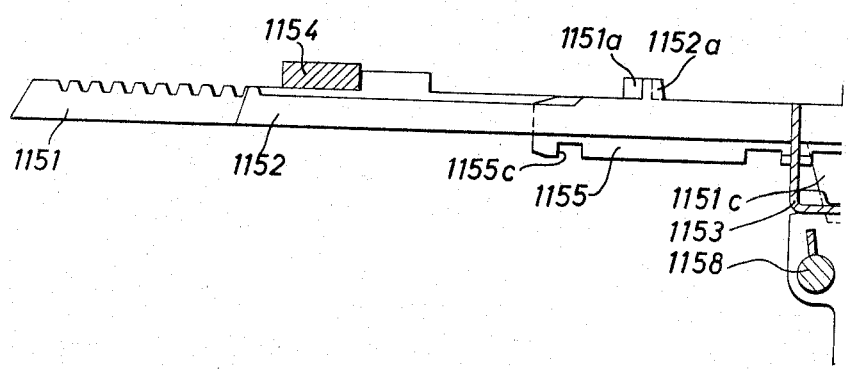
Figure 5B:
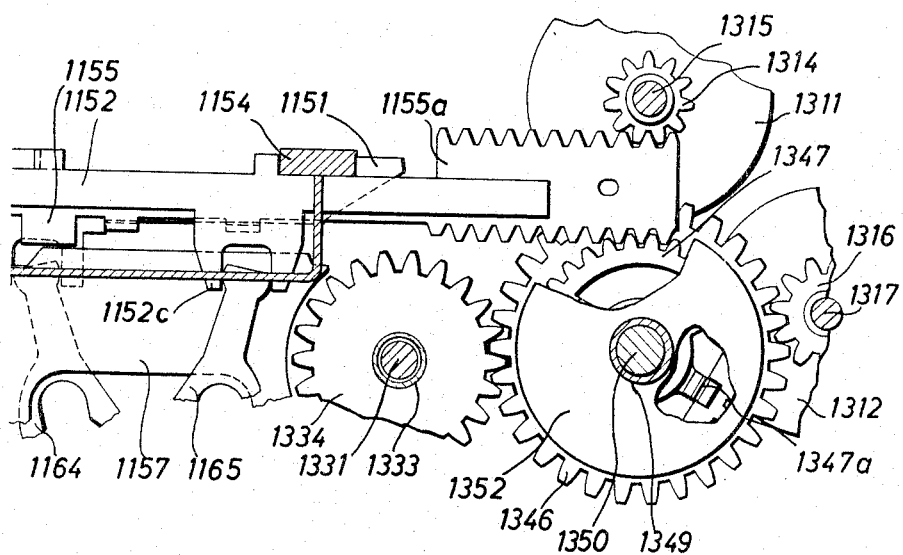

(2) *Selector differential assemblies 258.*—FIGS. 5A and 5B illustrate a transaction differential assembly 258 used in the selector banks controlled by the keys in the account bank 277, the merchandise bank 278 and the clerk bank 279. This differential assembly is substantially identical to the differential assembly 258 controlled by the keys in the print banks 275 and the amount banks 276 in including an accumulator rack 1151, a complementary rack or slide 1152, and an indicator rack or slide 1155 slidably mounted in slots on the supporting element 1153. However, the lower left-hand edge of the accumulator slide 1151 is not provided with the toothed portion 1151b because the differential assemblies 258 in the selector banks are not used to transfer digital information to or receive digital information from the accumulator assembly 264. In addition, the indicator slide 1155 includes a forwardly extending portion of greater length than the indicator slides used in the amount differential assemblies 258. This forwardly extending portion includes a notch 1155c for coupling the indicator rack 1155 to a corresponding selecting means in the accumulator assembly 264. The slides 1151, 1152 and 1155 are set under the control of the keys in the banks 277, 278 and 279 in the same manner as the amount differential assemblies 258.

Figure 6A:
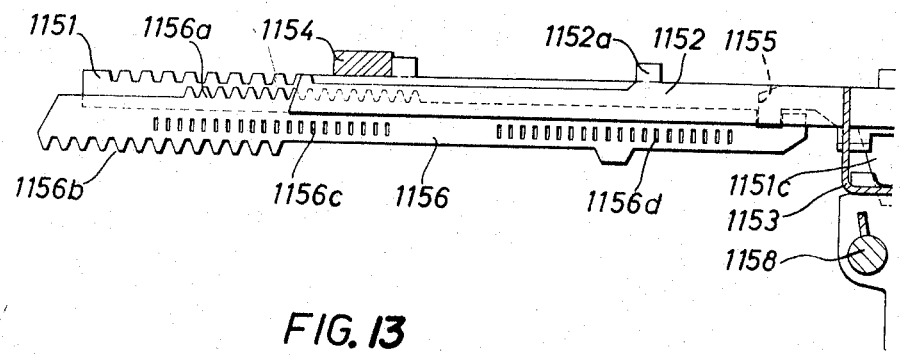
Figure 6B:
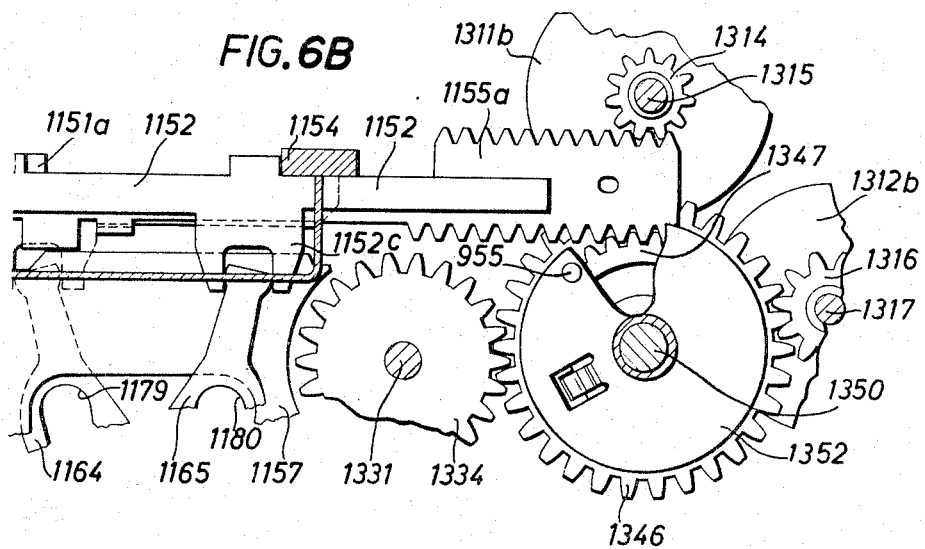
Figure 7:
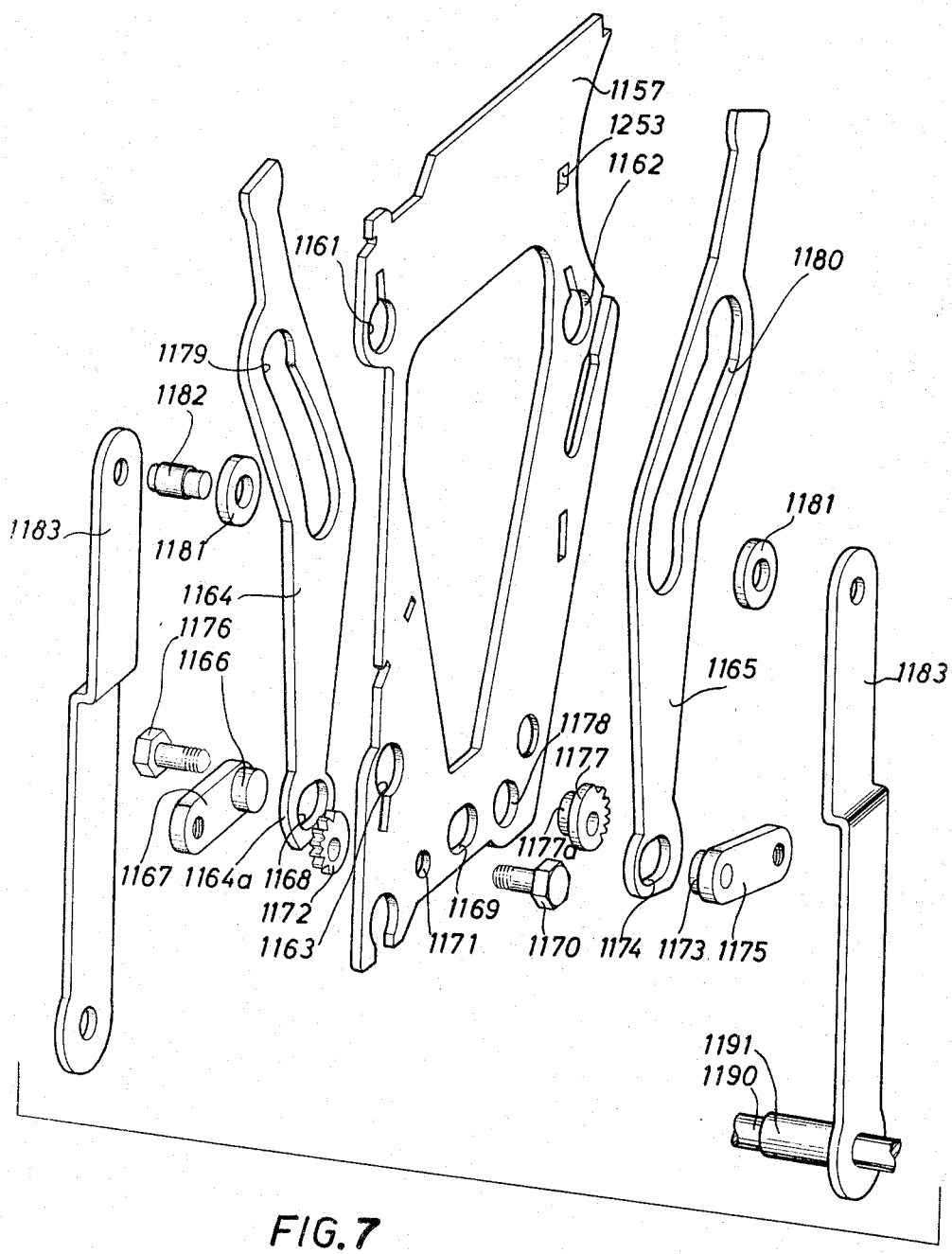
FIGURE 7 is an exploded view of an actuating means for one of the differential assemblies.

(3) *Mode of operation differential assembly 258.*—The differential assembly 258 controlled by the keys in the mode of operation bank 280 is illustrated in FIGS. 6A and 6B. In general, this differential assembly 258 is substantially identical to the remaining differential assemblies in including an accumulator rack 1151, a complementary slide or rack 1152, and an indicator slide or rack 1155 that are slidably mounted for parallel movement relative to each other within openings or slots formed in the supporting member 1153. The slides 1151 and 1152 include projections 1151a and 1152a at spaced portions along their upper edges which cooperate with depressed key shafts in the bank 280 to set the slides 1151 and 1152 in eleven different complementary positions corresponding to the eleven modes of operation provided in the illustrated cash register 250.

However, since the mode of operation bank 280 does not control the entry of digital information into the accumulator assembly 264, the left-hand lower edge of the accumulator rack 1151 does not include the toothed portion 1151b. In addition, the left end of the indicator slide 1155 is coupled to an additional slide 1156 that is slidably mounted on the main frame of the cash register for movement parallel to the slides 1151 and 1152 in accordance with the setting to which the indicator slide 1155 is adjusted. The slide 1156 provides the means for driving or actuating the plurality of different control assemblies in the cash register 250 controlled by the setting of the mode of operation differential assembly 258. More specifically, a toothed portion 1156a formed along the upper edge of the slide 1156 meshes with a pinion gear 880 on a control shaft in the keyboard assembly 256 to drive this control shaft to positions corresponding to the settings of the mode of operation differential assembly 258. The slide 1156 also includes a lower toothed portion 1156b that is used to control a slide locking means by which the amount differential assemblies 258 are set in sequence during reading and resetting operations. Two longitudinally spaced rows of apertures 1156c and 1156d on the slide 1156 drive means in the accumulator assembly 264 for selecting the different times during an operating cycle at which the accumulators are raised and lowered relative to the assemblies 258.

*Slide actuating means*

Each pair of accumulator slides 1151 and complementary slides 1152 is actuated by an individual differential actuator which moves the slides in opposite directions to complementary positions during a setting operation and which moves these slides in opposite directions to their normal positions at the conclusion of the setting operation. The differential actuators are operated by a main shaft 1073 of the cash register 250 in a timed sequence so that the differential assemblies 258 controlled by the transaction banks 277–280 of the keyboard assembly 256 are set prior to the concurrent setting of the differential assemblies controlled by the keys in the banks 275 and 276. In order to permit an amount to be entered by the amount banks 276 and carried into the accumulator orders driven by the differential assemblies associated with the keys in the print bank 275, means are provided controlled by the mode of operation bank 280 for disabling the resetting movement of the differential assemblies controlled by the keys in the print banks 275 during listing operations until after the entry of information into the accumulator assembly 264 during return movement of the differential assemblies 258 has been completed.

(1) *Differential actuators.*—The differential actuators used to drive the racks or slides 1151 and 1152 are substantially the same as those disclosed in the above identified Englund patents and are mounted on a plurality of apertured supporting plates 1157 (FIGS. 2A, 2B, 7 and 8) which are supported in spaced positions beneath each pair of slides 1151 and 1152 by a plurality of rods or shafts 1158, 1159 and 1160 which are secured to the side walls 961 and 1150. The rods 1158–1160 pass through aligned openings 1161–1163, respectively, in the plates 1157 and cooperate with spacer bars that maintain these plates in the desired spaced relationship. The upper end of each of the plates 1157 is received within openings formed in and is secured to the bight portion of the U-shaped support 1153.

To provide means for actuating the slides 1151 and 1152, each of these slides is provided with a depending portion 1151c and 1152c (FIGS. 5 and 6) which is received within a suitably formed slot in the bight portion of the support 1153 and which defines a downwardly open recess or notch. The upper end of a differential lever 1164 pivotally mounted on one side of the plate 1157 extends through an opening to the lower wall of the support 1153 to be disposed within the notch formed in the depending portion 1151c on the accumulator slide 1151, and the upper end of another differential lever 1165 disposed on the other side of the plate 1157 extends through an opening in the wall of the support 1153 to be disposed within the notch formed in the depending portion 1152c on the complementary rack or slide 1152.

The lower end of the lever 1164 is pivotally mounted on the plate 1157 by a stud 1166 (FIG. 7) on an arm 1167 which extends through an elongated opening 1168 in the lower end of the lever 1164 into an elongated opening 1169 in the plate 1157. The arm 1167 is secured to the plate 1157 by a machine screw 1170 that passes through an opening 1171 in the plate 1157 and an eccentrically disposed opening in an adjusting washer 1172 to be threadedly secured to the arm 1167. The lower end of the lever 1165 is pivotally mounted on the plate 1157 by a stud 1173 which extends through an elongated opening 1174 in the lower end of the lever 1165 to be disposed within the elongated opening 1169 in the plate 1157. The stud 1173 is carried on a link or arm 1175, and this arm is secured to the plate 1157 by a machine screw 1176 which passes through an eccentrically disposed opening in an adjusting washer 1177 to be threadedly received within the arm 1175. The adjusting washer 1177 includes a bossed portion 1177a that is rotatably mounted within an opening 1178 in the plate 1157. As illustrated in FIG. 8, the studs 1166 and 1173 mount the lowered ends of the levers 1164 and 1165 on opposite side of the plate 1157 for pivotal movement about substantially aligned axes.

The adjusting washer 1172 provides means for adjusting the "play" in the levers 1164 and 1165 when these levers are in the normal position shown in FIGS. 2A, 2B and 8. By engaging the serrations formed in the edge of the washer 1172 and turning this eccentrically mounted washer about the shank of the machine bolt 1170, the bearing contact between the washer 1172 and a rounded surface 1164a on the lever 1164 is adjusted to vary the "play" in normal position. The free motion or "play" of the levers 1164 and 1165 in a set position is adjusted by pivoting or turning the washer 1177 within the opening 1178. This shifts the position of the link or arm 1175 and, accordingly, the position of the stud 1173.

To provide means for pivoting the differential levers 1164 and 1165 in opposite directions to produce oppositely directed complementary movements of the slides 1151 and 1152, the levers 1164 and 1165 are provided with a pair of inclined cam slots 1179 and 1180, respectively. A pair of rollers 1181 carried on a shaft 1182 are disposed within the slots 1179 and 1180 and are positioned in the lower ends of these slots in the normal position of the differential actuator assembly 258 (FIG. 8). The ends of the shaft 1182 are carried on the upper ends of a pair of links 1183. When the links 1183 are moved upwardly, the rollers 1181 engage the walls of the slots 1179 and 1180 to pivot the lever 1179 in a clockwise direction about the stud 1167 and the lever 1165 in a counterclockwise direction about the stud 1173. This moves the accumulator rack 1151 to the right (FIGS. 2A and 2B) and the complementary slide 1152 to the left. Similarly, when the links 1183 are moved downwardly, the lever 1164 moves in a counterclockwise direction and the lever 1165 moves in a clockwise direction to restore the racks or slides 1151 and 1152 to their normal positions.

Figure 9:
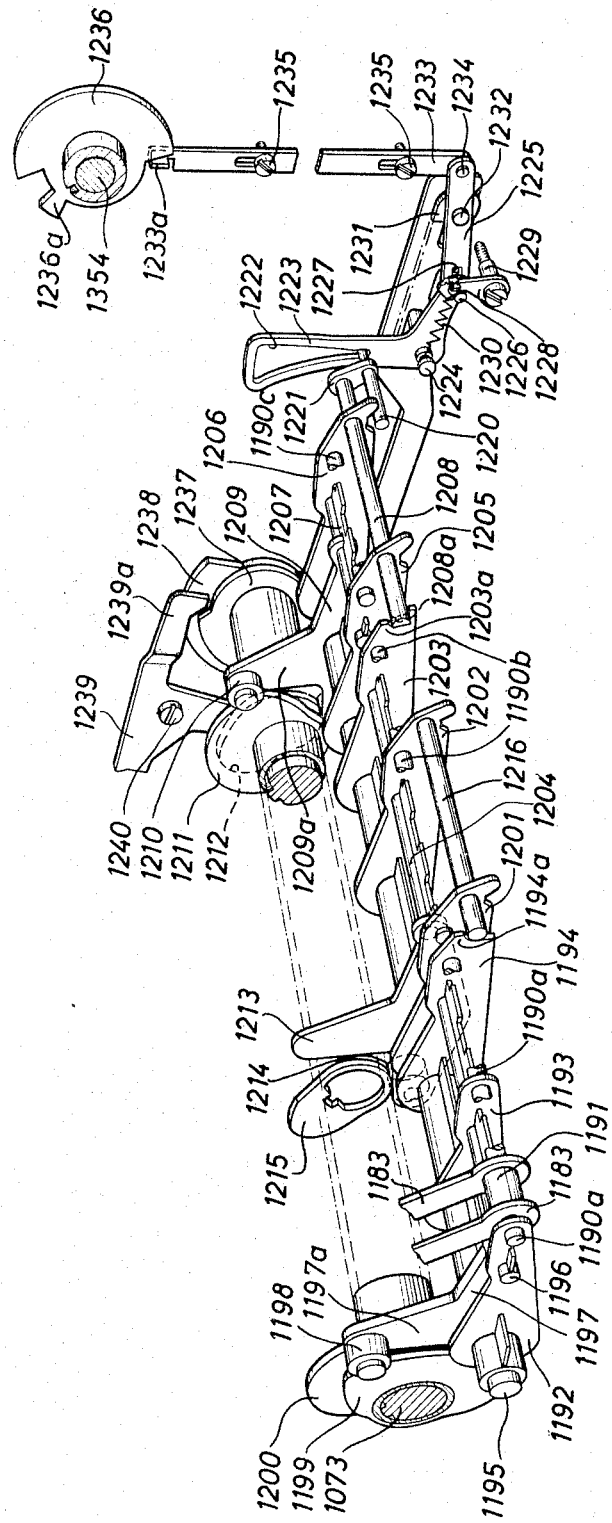
FIGURE 9 is a perspective view of a drive means for operating the differential actuating means shown in FIGURES 7 and 8 and also illustrates a print bank control means.

(2) *Driving means.*—The links 1183 for actuating the differential levers 1164 and 1165 in the differential assemblies 258 are raised and lowered at selected times during each cycle of operation of the cash register 250 by cam means driven by the main shaft 1073 of the cash register 250. The four pairs of links 1183 connected to the differential levers 1164 and 1165 in the four differential assemblies 258 controlled by the transaction banks of the keyboard assembly 256 are pivotally mounted on a shaft 1190a (FIG. 9) and are maintained in spaced positions thereon by a plurality of interposed spacing sleeves 1191. The shaft 1190a is carried on three arms 1192, 1193 and 1194 (FIGS. 3A and 9) which are pivotally mounted on a shaft 1195 and which are held in spaced parallel relation by a shaft 1196 and a cooperating notched plate or bar.

The links 1183 are raised and lowered by pivoting the arms 1192–1194 about the shaft 1195. To accomplish this, a cam follower lever 1197 is pivotally mounted on the shaft 1195 and is secured at one end to the shaft 1196. One arm 1197a of the cam follower lever 1197 carries a cam follower roller 1198 that is adapted to engage the periphery of a cam 1199 that is keyed to the main shaft 1073. A lower arm of the cam follower lever 1197 carries another roller that is adapted to engage the periphery of a cam 1200 that is also keyed to the main shaft 1073. When the main shaft 1073 rotates through a cycle, the cam 1200 pivots the arms 1192–1194 in a counterclockwise direction about the shaft 1195 to elevate the links 1083, thereby setting the four associated sets of racks 1151 and 1152. Thereafter, the cam 1199 engages the roller 1198 to pivot the arms 1192–1194 in a clockwise direction about the shaft 1195 to lower the links 1183 and restore the four pairs of slides 1151 and 1152 controlled by the keys in the transaction banks to their normal settings.

The six sets of links 1183 of the five differential assemblies 258 directly controlled by the keys in the amount banks 276 and the one assembly 258 disposed between the banks 275 and the banks 276 are pivotally mounted on a shaft 1190b with a plurality of spacing sleeves 1191 disposed therebetween. The shaft 1190b is carried on three arms 1201, 1202 and 1203 which are pivotally mounted on the shaft 1195 and secured in spaced parallel relation by a shaft 1204. The links 1183 associated with the three differential assemblies 258 controlled by the keys in the print banks 275 are pivotally mounted on a shaft 1190c with the spacing sleeves 1191 disposed therebetween. The shaft 1190c is carried on a pair of arms 1205 and 1206 that are pivotally mounted on the shaft 1195 and rigidly secured in a spaced parallel relationship by a connecting rod or shaft 1207 and an associated notched plate.

The arms 1205 and 1206 are normally connected to the arm 1203 and, thus, the arms 1201 and 1202 by a shaft 1208 that is rotatably mounted on the arms 1205 and 1206. The left end of the shaft 1208 is provided with a notched portion 1208a. In the normal setting of the shaft 1208, the notched end 1208a bears against a shoulder 1203a on the arm 1203 so that the arms 1201–1203, 1205 and 1206 can be concurrently pivoted about the shaft 1195 to simultaneously raise the nine sets of links 1183 for the differential assemblies 258 associated with the keys in the banks 275 and 276.

To provide means for pivoting these arms, a cam follower lever 1209 is pivotally mounted on the shaft 1195 and is secured at one end to the shaft 1207. One arm 1209a of the lever 1209 carries a roller 1210 that is adapted to engage the outer periphery of a cam 1211 that is keyed to the main shaft 1073. A lower arm 1209b (FIG. 10) of the lever 1209 carries a roller that is adapted to engage the outer periphery of another cam 1212 that is keyed to the main shaft 1073. When the main shaft 1073 is rotated in a clockwise direction, the cam 1212 pivots the arms 1205 and 1206 and, through the shaft 1208, the arms 1201–1203 in a counterclockwise direction about the shaft 1195 to raise the links 1183 in the nine amount differential assemblies 258. At a subsequent portion of the cycle of rotation of the main shaft 1073, the arms 1201–1203, 1205 and 1206 are pivoted in a clockwise direction about the shaft 1195 to restore the slides 1151 and 1152 in the amount differential assemblies 258 to their normal position.

With reference to FIG. 31 of the drawings, line 1 indicates that the cam 1200 elevates the links 1183 for actuating the four transaction differential assemblies between 20° and 93° of rotation of the main shaft 1073. After the setting of the transaction differential assemblies 258 has been completed, the cam 1212 elevates the arms 1201–1203, 1205 and 1206 to set the nine amount differential assemblies 258 between 118° and 191° of rotation of the main shaft 1073 (see line 2 in FIG. 31). Thus, at the end of 191° of rotation of the main shaft 1073, all of the differential assemblies 258 in the cash register 250 are in their operated settings (see lines 1 and 2 of FIG. 31).

As indicated above, the links 1183 carried on the shaft 1190b are elevated through the connection between the shaft 1208 and the shoulder 1203a on the arm 1203. To provide positive means for holding these operating links 1183 and their associated mechanisms in this elevated position, a cam follower lever 1213 (FIG. 9) is pivotally mounted on the shaft 1195 and is secured at one end to the arms 1201–1203 through the shaft 1204. A cam follower roller 1214 carried on a lower arm of the lever 1213 is engaged by a cam 1215 keyed to the main shaft 1073 after the arms 1201–1203 have been elevated to secure these arms in the elevated position between 191° and 211° of rotation of the main shaft 1073.

Following 211° of rotation of the main shaft 1073 (see lines 1 and 2 in FIG. 31), the cam 1199 engages the roller 1198 to pivot the lever 1197 in a clockwise direction about the shaft 1195. This lowers the arms 1192–1194 to restore the transaction differential assemblies 258 to their normal condition. In addition, a shoulder 1194a on the arm 1194 engages the end of a shaft 1216 carried on the arms 1201 and 1202 to pivot the arms 1201–1203 in a clockwise direction about the shaft 1195, thereby restoring six of the amount differential assemblies 258 to their normal condition. During this clockwise movement of the arm 1203, the shoulder 1203a on this arm engages the notched end 1208a of the shaft 1208 to pivot the arms 1205 and 1206 in a clockwise direction about the shaft 1195 to restore the three amount or print differential assemblies 258 to their normal condition. Thus, all of the differential assemblies 258 in the cash register 250 are concurrently restored to their normal condition during most cycles of operation of the cash register 250.

(3) *Print bank control*.—All of the differential assemblies 258 are concurrently reset to a normal condition during all resetting and reading operations of the cash register 250. However, in certain types of listing operations, it is sometimes desirable to actuate the keys in the print banks 275 to provide information only to the printing assembly 266 during the same cycle of operation in which the keys in the amount banks 276 are actuated to enter an amount in the accumulator assembly 264. Although the actuation of the keys in the banks 276 does not directly control the entry of data into those decades or orders of the accumulators in the assembly 264 that are controlled by the three print differential assemblies 258, information can be entered into these orders by carries from lower orders. Since the data is listed in the accumulator assembly 264 during the resetting movement of the amount assemblies 258, it would not be possible to concurrently operate the keys in both of the banks 275 and 276 unless the differential assemblies 258 controlled by the keys in the print banks 275 can be disabled or prevented from being reset until after the completion of the resetting of the amount differential assemblies 258 controlled by the keys in the amount banks 276. Accordingly, the cash register 250 includes means responsive to the setting of the mode of operation differential assembly 258 for selectively controlling the times at which the actuating means for the print bank differential assemblies 258 are restored to a normal condition.

This control is accomplished by shifting the position of the shaft 1208 carried on the arms 1205 and 1206 so that when the arms 1201–1203, 1205, and 1206 have been elevated, the connection between the arms 1201–1203 and the arms 1205 and 1206 can be opened to permit the arms 1205 and 1206 to be pivoted in a clockwise direction about the shaft 1195 to their normal position after the transaction and amount differential assemblies 258 have been restored to a normal condition under the control of the cam 1199 in the manner described above.

To shift the position of the shaft 1208 so that the print and amount differential assembly actuating means are selectively connected and interconnected, a pin 1220 is secured to the right end of the shaft 1208 by an arm 1221. The outer end of the pin 1220 is received within an opening 1222 formed in a lever 1223 (FIGS. 9–12) that is pivotally mounted on the side wall 1150 (FIG. 2B) by a pivot pin 1224. The other end of the lever 1223 is pivotally connected to one end of a lever 1225 by a pin 1226 that is carried on the lever 1223 and is received within an elongated slot 1227 formed in the lever 1225. The lever 1223 is latched in one of two positions by a pawl 1228 which is pivotally mounted on the wall 1150 by a machine screw 1229 and which is urged into engagement with the pin 1226 by a tension spring 1230 that is connected between the pivot pin 1224 and the pin 1226.

An intermediate portion of the lever 1225 is pivotally mounted on one end of a link 1231 by a shaft 1232, and the other end of the link 1231 is pivotally and slidably mounted on the shaft or pivot pin 1224 by a slot or notch. The end of the lever 1225 is connected to a slide 1233 by a pivot pin 1234. The slide 1233 is mounted for vertical translatory movement by a pair of machine screws 1235 that are received within slots in the slide 1233 and secured to the wall 1150. The upper end of the slide 1233 includes an offset lug portion 1233a that is adapted to detect the coded periphery of a control disc or cam 1236. This cam is adjusted to different angular positions under the control of the mode of operation differential assemblies 258 in dependence on the mode of operation for which the cash register 250 is conditioned during each cycle of operation. The disc 1236 includes a single projection 1236a that is moved into alignment with the lug 1233a when the mode of operation differential assembly 258 is in its ninth position in which the cash register 250 is conditioned for a listing operation.

To provide means for actuating the print bank control means, a pair of cams 1237 and 1238 are keyed to the main shaft 1073, and a cam follower lever 1239 is pivotally mounted on a shaft 1240. The lever 1239 includes an offset end portion 1239a for engaging the outer periphery of the cam 1237 and another offset portion 1239b that is adapted to engage the outer periphery of the cam 1238. The arm 1239b (FIGS. 10–12) is pivotally connected to one end of a link 1241 which is slidably mounted on the shaft 1224 by means of an elongated slot 1242 through which this shaft extends. The free end of the link 1241 includes a control cam slot 1243 in which is received the end of the pin 1232.

Figure 10:
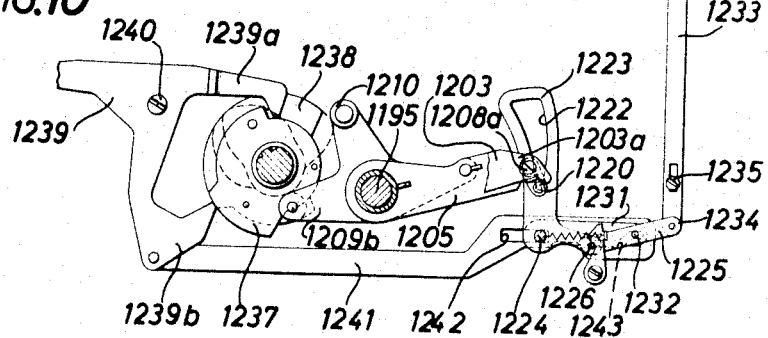
FIGURE 10 is a detail view of the print bank control means shown in a normal position following an operation of the cash register in which the keys in the print banks are not used.

FIG. 10 illustrates the print bank control means in its normal position following a cycle of operation in which the print banks 275 were not used. When a cycle of operation of the cash register 250 is initiated and clockwise rotation of the main shaft 1073 is started, the cam 1237 engages the arm 1239a on the cam follower lever 1239 so that this lever is pivoted in a counterclockwise direction about the shaft 1240 from the position shown in FIG. 10 to the position shown in FIG. 11. This moves the link 1241 to the right so that the pin 1232 moves from an upper portion of the slot 1243 in the link 1241 to the lower position therein shown in FIG. 11. Since the pawl 1228 engages the pin 1226 connecting the levers 1223 and 1225, the lever 1225 pivots about the axis of the pin 1226 in a clockwise direction from the position shown in FIG. 10 to the position shown in FIG. 11. This movement of the lever 1225 moves the detecting slide 1233 downwardly from the position shown in FIG. 10 to the position shown in FIG. 11 so that the offset lug 1233a is moved out of the path of movement of the control disc 1236.

The arms 1192–1194 are then pivoted in a counterclockwise direction about the shaft 1195 in the manner described above so that the transaction differential assemblies 258 are operated to their set positions. During this setting movement, the coded disc 1236 is adjusted to a position corresponding to the cash register operation selected by the mode of operation bank 280. During continuing rotation of the main drive shaft 1073, the arms 1201–1203, 1205 and 1206 are pivoted in a counterclockwise direction about the shaft 1195 so that the nine amount and print differential assemblies 258 are actuated to their set condition. As the arms 1205 and 1206 are elevated, the shaft 1220 moves along the left-hand arcuate edge of the opening 1222 in the lever 1223 to maintain the angular position of the shaft 1208 such that this shaft is held in alignment and engagement with the shoulder 1203a on the arm 1203. This maintains the connection between the operating means for the differential assemblies controlled by the keys in the print banks 275 and the amount banks 276.

Figure 11:
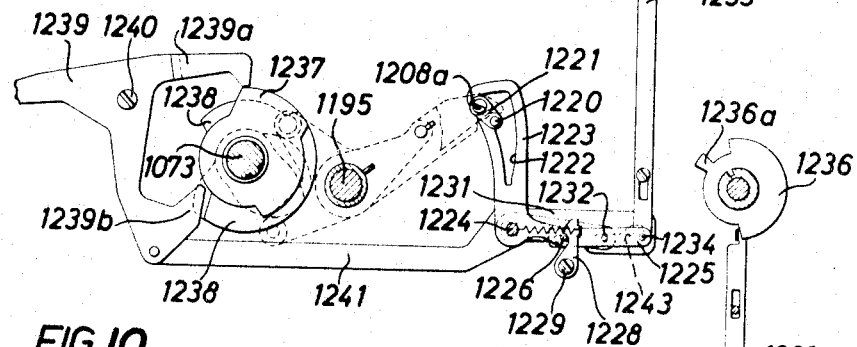
FIGURE 11 is a detail view of the print bank control means shown in an operated position during a cycle of operation in which the keys in the print banks are used.

At a time in the cycle of operation of the cash register 250 prior to 211° of rotation of the main shaft 1073, the cam 1238 engages the arm 1239b on the cam follower lever 1239 to pivot this lever about the shaft 1240 in a clockwise direction from the position shown in FIG. 11 to the position shown in FIG. 10. This moves the link 1241 to the left so that the engagement of the slot 1243 by the end of the pin 1232 pivots the lever 1225 in a counterclockwise direction about the axis of the shaft 1226. This moves the slide 1233 upwardly from the position shown in FIG. 11 to the position shown in FIG. 10. However, if the cash register 250 is not conditioned for a cycle of operation in which the print banks 275 are to be used, the projection 1236a is not disposed in the path of movement of the lug 1233a, and the end of the shaft 1208 remains beneath the shoulder 1203a to maintain the connection between the operating means for the print bank differential assemblies 258 and the amount bank differential assemblies 258. Thus, when the arms 1192–1194 are pivoted in a clockwise direction about the shaft 1195 beginning at 211° of rotation of the main shaft 1073 (see lines 1 and 2 in FIG. 31), all of the arms 1192–1194, 1201–1203, 1205 and 1206 are pivoted in clockwise direction about the shaft 1195 to concurrently restore all the differential assemblies 258 to their normal condition.

Assuming, however, that the cash register 250 is conditioned for a listing cycle of operation in which the keys in the print banks 275 are to be used to transmit information to the printing assembly 266 at the same time that the keys in the amount banks 276 are to be used to supply information to the accumulator assembly 264, the print bank control means is rendered effective to delay the return of the arms 1205 and 1206 to their normal position until after the differential assemblies 258 controlled by the keys in the transaction banks and the amount banks 276 have been reset. This prevents the print bank information from being entered into the higher orders of the selected accumulator in the assembly 264 and permits information to be carried into these higher orders from the lower orders of the selected accumulator controlled by the differential assemblies 258 associated with the keys in the amount banks 276.

When the listing cycles of operation of the cash register 250 is initiated, the print, amount, and transaction differential assemblies 258 are actuated to their set conditions in the manner described above, and the print control means is operated from the normal position shown in FIG. 10 to the position shown in FIG. 11. In addition, the setting of the mode of operation differential assembly 258 adjusts the control disc 1236 to the position shown in FIG. 11 in which the projection 1236a is disposed in the path of movement of the lug 1233a on the detecting slide 1233.

Figure 12:
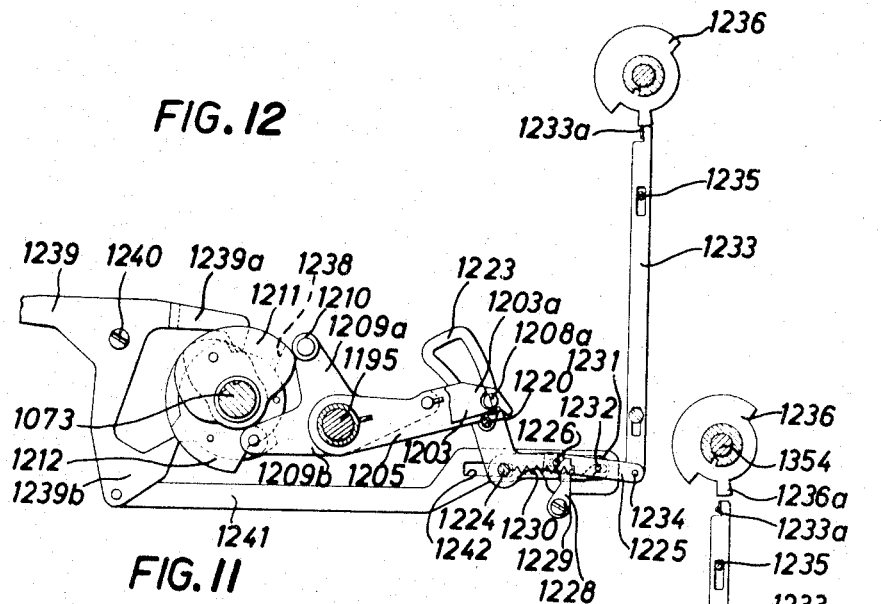
FIGURE 12 is a detail view of the print bank control means in a normal position following a cycle of operation of the cash register in which the keys in the different banks have been used.

The cam 1238 now pivots the cam follower lever 1239 in a clockwise direction about the shaft 1240 to the normal position shown in FIG. 12, and the link 1241 moves to the left. As described above, this produces an initial counterclockwise pivotal movement of the lever 1225 about the axis of the shaft 1226 so that the slide 1233 moves upwardly. However, the lug 1233a now engages the projection 1236a to arrest further vertical movement of this slide. The pivot pin 1234 now provides a new fulcrum for the lever 1225 and this lever pivots in a clockwise direction about the axis of the pin 1234 during continuing movement of the link 1241 to the left. When the lever 1225 pivots in a clockwise direction about the shaft 1234, the pin 1236 cams the pawl 1228 in a clockwise direction about the machine screw 1229 to permit the lever 1223 to be pivoted in a counterclockwise direction about the shaft 1224 to the position shown in FIG. 12. The tension spring 1230 snaps the pawl 1228 into engagement with the pin 1226 to hold the lever 1223 in the postion shown in FIG. 12.

This counterclockwise movement of the lever 1223 moves the right edge of the opening 1222 in the lever 1223 into engagement with the end of the shaft 1220 so that the arm 1221 pivots the shaft 1208 in a clockwise direction about its axis. This moves the notched portion 1208a of this shaft into alignment with the shoulder 1203a and disconnects the arms 1205 and 1206 from the arms 1201–1203. The arms 1201–1203 are not free to pivot in a clockwise direction about the shaft 795 toward a normal position inasmuch as the cam 1215 bears against the roller 1214 to hold these arms in their normal elevated position.

When the cam 1199 now pivots the arms 1192–1194 in a clockwise direction about the shaft 1195 to restore the transaction differential assemblies 258 beginning at 211° of rotation of the main shaft 1073, the shoulder 1194a on the arm 1194 again engages the shaft 1201 so that the five amount differential assemblies 258 are restored to a normal condition by the clockwise movement of the arms 1201–1203 about the shaft 1195. However, since the shoulder 1203a on the arm 1203 is now aligned with the recessed or cutout portion 1208a on the shaft 1208, the arms 1205 and 1206 are not positively returned to a normal position, and the three amount differential assemblies 258 controlled by the print banks 275 remain in their set condition. Suitable resilient means (not shown) connected to the arms 1205 and 1206 retain these arms in their elevated or operated position.

After the resetting of the transaction and amount differential assemblies 258 and the entry of information into the accumulator assembly 264 has been completed and the engaged accumulators have been disengaged from the differential assemblies 258, the cam 1211 engages the roller 1210 on the cam follower lever 1209 to pivot the arms 1205 and 1206 against the action of the resilient means in a clockwise direction about the shaft 1195 to restore the print bank differential assemblies 258 to a normal condition. This movement is shown in dashed line beginning at 310° and terminating at 350° in line 2 of FIG. 31. During this movement, the shaft 1220 engages the right edge of the opening 1222 in the lever 1223 to maintain the shaft 1208 in its rotated position in which the end of this shaft is held out of alignment with the shoulder 1203a. At the completion of this cycle of operation of the cash register 250, the print bank control means is in the position illustrated in FIG. 12.

When the next cycle of operation of the cash register 250 is initiated and regardless of whether the print banks 275 are to be used or not, the link 1241 is moved to the right in the manner described above so that the pin 1232 is forced toward the lower portion of the slot 1243. Since the right end of the lever 1225 is held in a fixed position by the slide 1233, the link 1225 pivots in a counterclockwise direction about the pivot pin 1232 so that the pawl 1228 is again pivoted in a clockwise direction about the machine screw 1229 to permit the pin 1226 to move beneath the projection on this pawl. When the lever 1225 reaches this position, continuing movement of the link 1241 cause the lever 1225 to pivot in a clockwise direction about the axis of the shaft 1226 so that the slide 1233 is lowered to the position shown in FIG. 11. This permits the position of the coded or control element 1236 to be changed in accordance with the following actuation of the mode of operation differential assembly 258.

When the lever 1225 pivots in a counterclockwise direction about the pivot pin 1234 from the position shown in FIG. 12 to the position shown in FIG. 11, the lever 1223 is pivoted in a clockwise direction about the shaft 1224 so that the shaft 1220 and the arm 1221 pivot the shaft 1208 in a clockwise direction about its own axis. This moves the end of the shaft 1208 beneath the shoulder 1203a on the arm 1203 so that the amount bank and print bank differential assembly actuating means are again connected. If the control disc 1236 is again set to a position indicating that the print banks 275 are to be used, the print bank actuators are again disconnected from the amount bank actuators following the setting of all the differential assemblies 258 in the manner described above. Alternatively, if the print banks 275 are not to be used, the print bank actuators and the amount bank actuators remain coupled so that all of the differential assemblies 258 are concurrently restored to a normal condition in the manner described above.

*Zero insertion*

It is desirable in accounting machine or cash register constructions to suppress zeros appearing to the left of the most significant digit in a digital word or number. Accordingly, the cash register 250 includes means associated with all but the three lowest ordered amount differential assemblies 258 for preventing the appearance of zeros in either the indicating assembly 260 or the printing assembly 266 to the left of the most significant digit. In the cash register 250, this is accomplished by constructing the printing assembly 266 and the indicator assembly 260 so that a blank space is in printing position or is visually displayed when a differential assembly 258 is held in a normal or zero representing position. If the differential assembly 258 is in a lower order than the order in which a significant digit appears, means are provided for operating the printing and display means in the assemblies 260 and 266 one step in a reverse direction to bring a "0" into printing or displaying position. Those of the amount differential assemblies 258 in orders higher than the one in which a significant digit appears remain in the zero setting position with a blank space in printing and display position. The printing and indicating elements in the lowest three orders provide "0" when the related differential assemblies 258 are held in a normal setting.

To provide zero insertion, each of the differential assemblies 258 having zero suppression or insertion is provided with a control yoke 1250 (FIG. 13) that is pivotally mounted on the shaft 1158 with its opposite arms 1250a and 1250b disposed on opposite sides of one of the supporting plates 1157 and with the bight portion of the yoke 1250 passing around the front edge of the associated plate 1157. Each of the arms 1250a is provided with a notch or recess 1251 in which is received a square shaft 1252 that is carried on and extends through aligned openings 1253 (FIG. 8) in the supporting plates 1157. In their normal position, the upper projection of the arm 1250a defining the notch 1251 rests on the upper edge of the square shaft 1252. The upper edge of each of the arms 1250b includes a flanged portion 1250c which rests on the upper edge of the arm 1250a of the yoke 1250 associated with the next highest order. Each of the yokes 1250 also includes a depending leg 1250d that is effective in a pivoted or displaced position of the yoke to control the movement of an associated indicator rack 1155 one step in a reverse direction to transfer the printing means and the visual display means in the assemblies 260 and 266 from a blank position to a "zero" representing position.

To provide means for selectively pivoting or displacing the zero suppression control yokes 1250, each of the six supporting plates 1157 and the actuating levers 1164 and 1165 mounted thereon that have zero insertion is mounted between the legs 1250a and 1250b of the control yoke 1250 for the next lowest order. As an example, the plate 1157 and the operating levers 1164 and 1165 for the thousands denominational order are disposed between the legs 1250a and 1250b of the control yoke 1250 shown at the left in FIG. 13. This left control yoke 1250 is used to control zero suppression or insertion in the hundreds denominational order. The yoke 1250 that is second from the left in FIG. 13 is used to control zero suppression or insertion in the thousands denominational order even though its legs embrace the supporting plate 1157 for the actuating means for the ten thousands differential assembly 258.

Each of the levers 1164 in the six assemblies 258 carries a pin 1254 (FIGS. 8 and 13–16). This pin extends beneath the lower edge of the arm 1250b of the yoke 1250 in which the lever 1164 is positioned and is normally disposed within a recess 1255 in the lower edge of the arm 1250a of the next control yoke 1250 to the right (FIG. 13). Thus, when the differential lever 1164 in any order is displaced from its normal position representing the entrance of a significant digit in this order, the pin 1254 carried on this lever passes under the lower surface of the adjacent arm 1250b on the yoke 1250 in which the differential assembly 258 is disposed and engages the curved lower edge of the arm 1250a on the control yoke 1250 disposed next to the right of the yoke in which the assembly 258 is located. This pivots this yoke in a counterclockwise direction about the shaft 1158 and is effective through the lugs 1250c to similarly pivot all of the control yokes 1250 in lower orders.

As an illustration, the assumed thousands order differential assembly 258 in FIG. 13 has been displaced from its normal position, indicating the entrance of a significant digit in the thousands order, and the pin 1254 has been displaced to pivot the second from the left control yoke 1250, representing the thousands order, in a counterclockwise direction. This displacement of the thousands order control yoke 1250 is effective through the lug 1250c on the left-hand yoke 1250 to pivot this hundreds order control yoke in a counterclockwise direction about the shaft 1158. This motion is transmitted to the remaining control yoke 1250 assigned to the next lowest order. Accordingly, whenever a significant digit is entered, the control yoke 1250 for this order and the control yokes for all lower orders in which zero insertion is desired are pivoted in a counterclockwise direction about the shaft 1158.

The mechanism for producing a one-step reverse movement of the indicator slides or racks 1155 under the control of the normal or displaced position of the control yokes 1250 is illustrated in FIGS. 14–16 of the drawing. FIG. 14 illustrates the mechanism for one assembly 258 in a normal condition in which the illustrated control yoke 1250 is in a normal displaced position. In the interval between 6° and 58° of rotation of the main shaft 1073 (see line 5 in FIG. 31), a shaft 1256 to which an arm 1257 is secured is pivoted in a counterclockwise direction to move the arm 1257 from the position shown in FIG. 14 to the position shown in FIG. 15. A roller 1258 carried on the free end of the arm 1257 is disposed within a cam slot 1259 in an arm 1260 that is pivotally mounted on a shaft 1261. The counterclockwise movement of the arm 1257 is effective through the roller 1258 and the slot 1259 to pivot the arm 1260 in a clockwise direction about the shaft 1261 so that a notch 1260a is moved to the position shown in FIG. 15 in which it is aligned with a projecting portion 1262a formed on the outer free end of an arm 1262 that is pivotally mounted on a shaft 1263. The shaft 1263 is secured to a slide 1264 having a notch 1264a formed in its lower end to pivotally and slidably mount the slide 1264 on the shaft 1261.

During the interval between 118° and 191° of rotation (see line 2 in FIG. 31), the amount differential assemblies 258 are set, and all of the control yokes 250 in the orders below the highest order in which a significant digit appears are pivoted in a counterclockwise direction about the shaft 1158 from the normal position shown in FIG. 14 to the position shown in FIG. 15. In each of the orders in which the control yokes 1250 are displaced, the lower edge of the depending portion 1250d bears against a roller 1265 carried on the free end of the arm 1262 to pivot this arm about the shaft 1263 in a counterclockwise direction against the action of a return spring 1266 connected between the frame and the arm 1262. During this counterclockwise rotation of the arms 1262, the projecting portion 1262a thereon is moved into the notch 1260a on the arm 1260 so that in all of the orders below the order in which a significant digit appears, the arms 1260 and 1262 are connected.

In the following interval between 191° and 220° of rotation, the shaft 1256 rotates the arms 1257 in a clockwise direction to pivot the connected ones of the arms 1260 in a counterclockwise direction about the shaft 1261. This pulls the connected arms 1262 downwardly and to the left from the position shown in FIG. 15 to the position shown in FIG. 16. This movement of the arms 1262 is effective to move each of the indicator racks 1155 one step in a reverse direction in only the orders below the highest order in which a significant digit appears and also in which the assembly 258 remains in a normal position.

More specifically, an upper portion 1264b of the slide 1264 is offset outwardly from the page in FIGS. 14–16 and extends upwardly through a slot in the supporting frame 1153 so that a notch in this offset portion receives a lug 1155b (see also FIG. 2B) when the related indicator rack 1155 remains in a normal or zero position. A second lever or slide 1267 is pivotally mounted at its lower end on the shaft 1261 and includes an elongated slot 1268 through which the shaft 1263 extends. An upper portion 1267a of the lever 1267 is offset out of the page in FIGS. 14–16 and is normally disposed beneath the lug or projection 1155b on the related indicator rack 1155. The upper end of the offset portion 1267a is disposed beneath the path of travel of the lug 1155b so that the indicator rack 1155 is free to move from its normal or zero position if the related differential assembly 258 is actuated during a setting operation.

When the arm 1262 first begins to move downwardly and to the left from the position shown in FIG. 15 to the position shown in FIG. 16 in the manner described above, a hook-shaped recess 1264c on the slide 1264 bears against the square shaft 1252 to permit the slide 1264 to move only downwardly. This pulls the left-hand end of the related indicator slide 1155 downwardly so that it is aligned with the upper end 1267a of the slide 1267. During continuing movement of the arm 1262, the slide 1264c is lowered below the shaft 1252, and both of the slides 1264 and 1267 are pivoted in a counterclockwise direction about the shaft 1261. During this movement, the slides 1264 and 1267 pull the connected indicator slide 1155 one step in a reverse direction so that the printing and display elements in the printing assembly 266 and the indicator assembly 260 move from a blank position to a "0" position. Thus, a zero is inserted in place of a blank in all of the orders below the highest order in which a significant digit appears and in which a significant digit has not been entered under the control of either the accumulator assembly 264 or the amount banks 276.

The indicator racks 1155 remain locked in this retracted position until the beginning of the next cycle of operation of the cash register 250 (see line 5 in FIG. 31). At this time, the arm 1257 is again pivoted in a counterclockwise direction to pivot the arm 1260 in a clockwise direction. This permits the tension spring 1266 to displace the arm 1262 in a clockwise direction about the shaft 1263 and to release the connection between the arms 1260 and 1262 prior to the time at which the amount and print bank differential assemblies 258 are set (compare line 2 in FIG. 31 with line 5 in FIG. 31). A tension spring 1269 connected to the slide 1264 restores this slide and the slide 1267 to a normal condition and releases the indicator rack or slide 1155. Thus, the differential assemblies 258 and the control means associated therewith include means for inserting automatically zeros in place of blank spaces in all of the orders below the highest order in which a significant digit appears.

*Slide locking control*

As indicated above, the amount differential assemblies 258 are capable of being set to digit representing positions under the control of depressed keys in the banks 275 and 276, an accumulator gear engaged by the toothed portion 1151b on the accumulator slide 1151, or a locked indicator slide 1155. When the differential assemblies 258 are set under the control of depressed keys in the banks 275 and 276 or locked slides 1155, the accumulator slides or racks 1151 and the complementary racks 1152 are capable of substantially concurrent movements in opposite directions toward their complementary positions. However, when the differential assemblies 258 are to be set under the control of an engaged accumulator, it is desirable to arrest movement of the complementary racks 1152 until after the accumulator slides 1151 have completed their setting movements.

Accordingly, the cash register 250 includes slide locking means of the type described and disclosed in detail in Patent No. 3,103,309 for preventing movement of the complementary slide 1152 in the amount differential assemblies 258 during reading and resetting operations of the cash register until after the setting of the related accumulator racks 1151 under the control of an engaged accumulator has been completed. Since this slide locking means is substantially identical to that disclosed in the patent, the details of this mechanism are not disclosed herein except for the improvements therein by which the slide locking control means is automatically rendered effective or ineffective in accordance with the mode of operation for which the cash register 250 is conditioned.

In general, the slide locking control means includes a plurality of slide locking arms pivotally mounted on the main frame of the cash register and disposed between the lower surface of the lower plate 310 of the keyboard assembly 256 and the top of the differential assemblies 258. The slide locking arms are resiliently connected to a common actuating slide that normally holds the slide locking arms in an ineffective position in which concurrent movement of the accumulator slides 1151 and the complementary slides 1152 can be obtained. These slide-locking arms are retained in ineffective positions during listing operations of the cash register. However, when the cash register 250 is to perform a resetting or a reading operation, the common actuating slide is displaced to a position in which each of the slide locking arms is biased against an individual control slide (not shown) in each of the amount differential assemblies 258.

With the slide locking arms in this position, a depending portion on each of these arms is disposed in alignment with a left portion (FIG. 2A) on one of the complementary slides 1152. This depending portion blocks the setting movement of the complementary slide 1152 and of the connected differential lever 1165 and insures that only the accumulator slide 1151 can be actuated in a setting direction by the connected differential lever 1164. When each of the accumulator slides 1151 is adjusted to the setting determined by the engaged accumulator, suitable means, such as an elongated tooth on the accumulator gear, shifts the control slide so that the resiliently biased slide locking arm moves out of alignment with the left end of the complementary slide 1152 and into engagement with one of the notches in a toothed portion 1151d. This locks further setting movement of the accumulator slide 1151d without placing any stress on the engaged accumulator gear. The complementary slide 1152 now moves to a complementary setting after which the slide locking arms are all restored to a normal condition by the common operating slide, and the slides 1151 and 1152 are returned to their normal positions.

The slide locking control embodied in the cash register 250 includes new and improved control means illustrated in FIGS. 17 and 18 of the drawings for automatically shifting the common operating slide in accordance with the type of operation for which the cash register is conditioned. This control assembly is mounted on the wall 961 of the main frame of the cash register and an additional supporting wall 1275 and includes a common operating slide 1276. This slide is slidably mounted on the cash register's main frame and is resiliently biased to the right (FIG. 18) by a tension spring 1277 connected between the slide 1276 and the frame. In the normal right-hand position to which the slide 1276 is urged, the plurality of slide locking arms are held in an ineffective position. To provide means for selectively shifting the slide 1276 to the left to render the plurality of slide locking arms effective, the upper end of a lever 1278 is disposed within an opening 1276a in the slide 1276 and is pivotally mounted on a shaft 1279 that is carried on the upper ends of a pair of levers 1280. A roller 1281 is mounted on the shaft 1279 to one side of the lever 1278. The two levers 1280 are pivotally mounted on the frame by a shaft 1282, and the offset lower ends 1280a of these levers are connected by a stud 1283.

The levers 1278 and 1280 are selectively rendered effective to shift the slide 1276 under the control of the mode of operation differential assembly 258. More specifically, the toothed portion 1156b on the slide 1156 that is coupled to the indicator rack 1155 in the mode of operation differential assembly 258 (FIGS. 6A and 18) engages a gear 1284 that is pivotally mounted on a shaft 1285 carried by the main frame of the cash register 250. The gear 1284 is connected to a coded member 1286 by sleeve 1287 and is moved to eleven different positions corresponding to the eleven settings of the mode of operation differential 258. The coded disc 1286 is provided with a projection 1286a in each of the settings of the mode of operation differential assembly 258 in which a reading or resetting operation is to be performed and is not provided with the projection 1286a in those settings of the mode of operation differential assembly in which a listing operation is to be performed. Accordingly, in the illustrated embodiment of the cash register 250, the coded disc 1286 is provided with projections 1286a in settings "1," "2," "3," "6," "7," "8," "10," and "11" of the mode of operation differential assembly 258. The projections or openings on the periphery of the coded disc 1286 are detected by a detecting slide 1288 that is slidably mounted on the frame element 1275 and an additional frame element 1289. The slide 1288 is disposed between the levers 1280 and includes a slot 1288a in which the lower end of the lever 1278 is disposed.

To provide means for actuating the detecting slide 1288 and the levers 1278 and 1280, a cam 1290 is rotatably mounted on the shaft 1077 driven in synchronism with the main shaft 1073. The outer face of the cam 1290 carries a roller 1291 that is adapted to be moved into engagement with a curved end portion 1292a on a cam follower lever 1292 that is pivotally mounted on the frame by a shaft 1293. The lever 1292 also carries a roller 1294 that bears against the outer periphery of the cam 1290. The other end of the lever 1292 is pivotally connected to an actuating slide 1295 by a pivot pin 1296. The slide 1295 is slidably mounted on the supporting plate 1275 by a plurality of shouldered fasteners 1297 and includes both a lower opening 1295a for receiving the lower ends 1280a of the levers 1280 and an upper opening 1295b through which the detecting slide 1288 extends.

To provide means for latching the operating slide 1295 in either its elevated or its lowered position, a pawl element 1298 is pivotally mounted on a shaft 1299 and is resiliently biased for clockwise movement about the axis of the shaft 1299 by a connected tension spring 1300. A projection on the pawl 1298 cooperates with two recesses formed in the right edge of the slide 1295 (FIG. 17) to latch the slide 1295 in either its elevated position or its lowered position.

When the cash register 250 is placed in operation, the transaction differential assemblies 258 are operated to their set positions so that the slide 1156 rotates the gear 1284 and the coded member 1286 to a setting corresponding to the setting of the mode of operation differential assembly 258. This operation is completed by 93° of rotation (see line 1 in FIG. 31). Assuming that the cash register is to perform a reading or resetting operation, one of the projecting portions 1286a is moved into alignment with the left end (FIG. 18) of the detecting slide 1288. In the interval between 108° and 118° (see line 3 in FIG. 3), the cam 1290 is rotated in a clockwise direction to move the roller 1291 into engagement with the end portion 1292a on the cam follower lever 1292 so that this lever is pivoted in a clockwise direction about the shaft 1293. This elevates the slide 1295 so that its upper end bears against the roller 1281 and pivots the levers 1280 in a counterclockwise direction about the shaft 1282.

During this movement, the lower ends 1280a of these levers move into the opening 1295a in the slide and an aligned opening in the supporting plate 1275. When the levers 1280 are pivoted in a counterclockwise direction, the shaft 1279 is displaced to the left (FIG. 18), and the left end of the detecting slide 1288 moves toward the code disc 1286. Since the detecting slide 1288 is locked against further movement to the left by engagement with the projection 1286a, the continuing movement of the levers 1280 in a counterclockwise direction about the shaft 1282 moves the lever 1278 to the left to displace the slide 1276 against the resilient bias of the spring 1277 to move the slide locking arms to their effective position in which movement of the complementary slides 1152 is arrested.

The plurality of slide locking arms are individually moved from their positions blocking the complementary slides 1152 to positions freeing the complementary slides 1152 and locking the accumulator slides 1151 under the control of the control slides which are provided in each of the amount differential assemblies 258 and which are actuated by the engaged accumulators. In the interval between 205° and 215° of rotation (see line 3 in FIG. 31), the outer periphery of the cam 1290 engages the roller 1294 to pivot the lever 1292 in a counterclockwise direction about the shaft 1293 so that the slide 1295 is moved downwardly. The upper edge of the opening 1295a engages the lower end portions 1280a of the levers 1280 to pivot these levers in a clockwise direction about the shaft 1282. This swings the shaft 1279 to the right (FIG. 18) to move the detecting slide 1288 out of engagement with the coded disc 1286 and to permit the return spring 1277 to restore the slide 1276 to its normal position. This returns the plurality of slide locking arms to their normal and ineffective positions. The slides 1151 and 1152 in the amount differential assemblies 258 can now be returned to their normal positions starting at 211° of rotation.

If the cash register 250 is conditioned for a listing operation so that a notch or opening is disposed in the path of movement of the detecting slide 1288, the lower end of the lever 1278 is not blocked against movement to the left when the slide 1295 is elevated, and the lever 1278 pivots in a clockwise direction about the shaft 1279 during the counterclockwise rotation of the levers 1280 so that the slide 1276 is not moved. Thus, the slide locking control means shown in FIGS. 17 and 18 is automatically controlled by the setting of the mode of operation differential assembly 258 to selectively render the slide locking arms of the cash register 250 effective or ineffective in accordance with whether the cash register is conditioned for a listing or a reading or resetting mode of operation.

INDICATING ASSEMBLY 260

The indicating assembly 260 is operated or set under the control of the plurality of differential assemblies 258 and includes a plurality of indicator drums for visibly displaying to the customer and to the operator of the cash register 250 the information entered into or recovered from the machine during the preceding cycle of operation and the type of operation performed by the cash register. The indicating assembly 260 also supplies information to be recorded by the printing assembly 266 and is of such a construction that the information can be displayed or transmitted to the recorder in any desired order and permits the recording assembly 266 to be disposed at either side of the cash register 250. The indicating assembly 260 includes a repeat control assembly 1310 controlled by the depression of the repeat key 293 in the mode of operation bank 280 for repeatedly entering identical items of information into the cash register 250 by locking the indicating assembly 260 in its previous position and setting the plurality of differential assemblies 258 in accordance therewith.

General construction

The indicating assembly 260 (FIGS. 2, 3, 5, 6, and 19) includes thirteen indicator drums 1311a–1311h, 1311m and 1311n visible through the openings 262 at the front of the cash register 250 and twelve indicating drums 1312b–1312h, 1312m and 1312n visible to the customer through suitable openings or windows 1313 (FIG. 3A) at the back of the cash register 250. The indicator drums 1311 are each secured to a connected gear 1314, and each connected indicator drum 1311 and gear 1314 is rotatably mounted on a shaft 1315 supported between the side walls 961 and 1150. Each of the gears 1314 is engaged by the upper row of teeth on the toothed portion 1155a on one of the indicator racks 1155 so that each of the indicator drums 1311 is set to a position corresponding to the setting of the related differential assembly 258. The indicator drums 1311a–1311d are set by the mode of operation, clerk, merchandise and account differential assemblies 258. The remaining nine indicating drums 1311e–1311h, 1311m and 1311n are set by the nine amount differential assemblies 258.

The outer peripheries of the drums 1311a–1311d are provided with suitable spaced indicia representing the corresponding settings of the related transactions differential assemblies 258. As illustrated in FIGS. 1 and 3, this indicia can comprise indicia corresponding to that impressed on the keys in the related key banks. The drums 1311e–1311g are provided with indicia representing "0" and the digits "1–9." On the remaining indicating drums 1311h–1311k, 1311m and 1311n, the outer surfaces are provided, in sequence, with "0," a blank space, and the digits "1" through "9." This indicia is arranged on the indicating drums 1311 so as to be disposed in alignment with the windows or openings 262 to correspond to the setting of the related differential assembly 258.

Each of the indicator drums 1312b–1312h, 1312m and 1312n is secured to a gear 1316, and each connected gear 1316 and indicator drum 1312 is rotatably mounted on a shaft 1317 that is secured between the walls 961 and 1150. When viewed from the back of the cash register 250, the three left-hand drums 1312b–d represent the clerk, merchandise, and account information, respectively. An indicator drum 1312 corresponding to the drum 1311a that supplies mode of operation information is not provided on the rear line of indicator drums. The remaining nine indicator drums 1312, when viewed from left to right in FIGS. 3 and 19, represent amount information considered from the highest order to the lowest order. Thus, the positions of the drums 1311 and 1312 are reversed in order to provide an amount representation that can be read in normal order from left to right in descending denominational order. To facilitate a comparison of the positions of the indicator drums 1311 and 1312, like alphabetical designations have been used on these two sets of drums to indicate drums displaying like digits. The drums 1312e–1312k, 1312m and 1312n are provided with the same indicia as the corresponding drum 1311.

As set forth above, the indicator assembly 260 also supplies information to the printing assembly 266. The printing assembly 266 includes thirteen printing drums or wheels 1318–1330 (FIG. 19B) which represent the nine digits of numerical information, the account information, the merchandise information, the clerk information and the mode of operation information, respectively. The mode of operation drum 1330 is secured to a shaft 1331 that is rotatably mounted in the side wall 961 at its left end (FIG. 19A) and is rotatably mounted in a frame element at its right end (FIG. 19B). The remaining printing drums 1318–1329 are secured to the right ends of a plurality of telescoping shafts or tubes 1333 that are mounted for rotation relative to each other about the axis of the shaft 1331. A gear 1334 is secured to the left end of each of the telescoping shafts 1333. A split nylon bearing 1335 is inserted between each end of the telescoping shafts 1333 and the next adjacent one of the shafts 1333 and is held in position by a split nylon sleeve 1336. Thus, the bearings 1335 can be replaced by removing the sleeve 1336 to permit the removal and insertion of a new bearing 1335 without requiring the telescoping shafts 1333 to be dismounted from the frame of the cash register 250. The axial slot in the bearings 1335 also permits thermal movement or distortion without adversely affecting the movement of the shafts 1333. The gear 1334 for rotating the shaft 1331 is secured to the shaft by a hub 1337 and a set screw 1338.

To provide means for transferring the settings of the indicator racks or slides 1155 to the indicator drums 1312 and the type wheels 1318–1330, each differential assembly 258 in the cash register 250 is provided with a transfer wheel assembly 1345 (FIG. 19) including three gears or wheels 1346, 1347 and 1348. These three wheels are rotatably mounted on a bearing 1349 carried on a shaft 1350 that is supported between the side walls 961 and 1150, and the transfer wheel units 1345 are supported in spaced positions on the shaft 1350 by a plurality of interposed spacer sleeves 1351. Each of the wheels or gears 1347 is engaged by the teeth on the lower edge of the toothed portion 1155a of the associated indicator rack or slide 1155 (FIG. 2B) and is connected to the wheel 1346 by a tongue 1346a which is formed integral with the wheel 1346 and which is received within a notch 1347a formed in the wheel or gear 1347. Thus, the wheels 1346 and 1347 move together. The wheel 1348 in each of the transfer wheel assemblies 1345 rotates freely about the bearing 1349 and is not connected to the joined wheels 1346 and 1347. In the transfer wheel assemblies 1345 driven by the racks 1155 in the four transaction differential assemblies 258, the wheel 1348 is replaced by a cover plate 1352.

To transmit information from the four indicator racks 1155 in the transaction differential assemblies 258, the driven wheels 1346 in these four assemblies directly mesh with the gears or wheels 1334 secured to the shaft 1331 and the three inner telescoping shafts 1333 to transmit the transaction information to the four transaction type wheels 1327–1330. In addition, the three wheels 1346 driven by the clerk, merchandise and accounting differential assemblies 258 directly mesh with the gears 1316 to set the indicator drums 1312b–1312d. In addition, the wheel 1346 driven by the fifth amount differential assembly 258 directly engages the gears 1334 and 1316 to directly drive the type wheel 1322 and the indicator drum 1312i. However, because the amount information on the indicator drums 1311 and 1312 is to be read from highest order to lowest order when considered from left to right from opposite sides of the machine and because the type wheels 1318–1326 are also to provide information from lowest to highest order when considered from left to right (FIG. 19B), the wheels 1346 driven by the remaining amount differential assemblies 258 cannot directly engage the gears or wheels 1334 and 1360.

To accomplish the necessary inversion in order, the transfer wheel assemblies 1345 driven by all of the remaining amount differential assemblies 258 are reversed in position on the shaft 1350 so that the connected wheel 1346a is disposed to the left (FIG. 19) and is used to drive an intermediate motion transmitting system. This motion transmitting system includes a plurality of telescoping shafts or sleeves 1353 which are rotatably mounted on each other for rotation about the axis of a shaft 1354 that is carried between the side walls 961 and 1150. The telescoping shafts 1353 are rotatably mounted on and spaced from each other by the use of the split nylon bearings 1335 and the spacer sleeves 1336. One end of each of the telescoping shafts 1353 is secured to a gear or wheel 1355 that meshes with and is driven by the driven wheel 1346 in one of the transfer wheel assemblies 1345. The other end of each of the telescoping shafts 1353 is secured to a gear or wheel 1356 that meshes with the idler wheel 1348 in one of the transfer assemblies 1345 and with the gear 1316 connected to one of the indicator drums 1312.

As an example, the gear 1355 driven by the wheel 1346 in the transfer wheel assembly 1348 actuated by the lowest order amount differential assembly 258 drives the connected gear 1356 disposed at the extreme right in FIG. 19B. This gear 1356 engages the extreme right-hand gear 1316 to set the indicator drums 1312e displaying the lowest order amount digit. This gear or wheel 1356 also engages the idler wheel 1348 in the right-hand transfer wheel assembly 1345 (FIG. 19B) which actuates the right-hand gear 1334 that is secured to the lowest order amount wheel 1318. In similar fashion, the remaining pairs of transfer gears or wheels 1355 and 1356 secured to the opposite ends of the telescoping shafts 1353 drive the related indicator drums 1312 and type wheels 1319–1326 to provide information in the proper order in the printing assembly 266 and the back bank of indicator drums 1312.

The shaft 1354 also supports means for transmitting control information from certain of the transaction differential assemblies 258 to various control mechanisms provided in the cash register 250. More specifically, the wheel 1346 in the transfer wheel assembly 1345 driven by the mode of operation differential assembly 258 meshes with a gear or wheel 1357 secured to the left end of a sleeve 1358 (FIG. 19A) that is rotatably mounted on the shaft 1354. The right end of the sleeve 1358 is secured to a member 1359 (FIG. 19B) that shifts a plurality of coded elements, most of which are used to control the operation of the printing assembly 266, to a position corresponding to that of the mode of operation assembly 258. This group of coded discs includes the control disc 1236 in the print bank control means. In addition, the wheel 1346 in the transfer wheel assembly 1345 driven by the account differential assembly 258 meshes with a gear 1360 that is secured to a sleeve 1361. The sleeve 1361 is rotatably mounted on the outer surface of the sleeve 1358 and is secured to an element 1362 that sets a coded member forming a part of a control for the printing unit 266.

*Aligning and locking means*

The indicator assembly 260 includes means for aligning the telescoping shafts 1333 and the indicating drums 1311 and 1312 and for locking these components in adjusted positions between successive cycles of operation of the cash register 250. The locking and aligning means for the telescoping shafts 1333 comprises a locking rail 1370 (FIGS. 2B, 23, and 30) which is slidably mounted within slots 1371 formed in the differential assembly supporting plates 1157 and two plates 1369 (FIG. 23) carried on the walls 961 and 1150. The rail 1370 is adapted to engage the teeth formed on the gears 1334 secured to the telescoping shafts 1333. A compression spring 1372 positioned in an opening 1370a (FIG. 30) and interposed between an arm 1373a of a lever 1373 and the rail 1370 normally biases the rail 1370 to the position shown in FIGS. 2B, 23, and 30 in which it is received within the space between adjacent teeth on the gears 1334.

To provide means for shifting the locking rail 1370 into and out of engagement with the wheels 1334, two similar drive means (FIGS. 20 and 23) are provided. Each of the drive means is disposed adjacent one of the side walls of the frame and each includes one lever 1373 which is pivotally mounted on the frame by a shaft 1374. Another arm 1373b on each of these levers is pivotally connected to an arm 1375a (FIG. 20) on a cam follower lever 1375 by a pivot pin 1376. The lever 1375 is pivotally mounted on the shaft 1195 and includes a pair of additional arms on which a pair of rollers 1378 and 1379 (FIGS. 20 and 30) are mounted. The roller 1378 cooperates with the outer periphery of a cam 1380 that is keyed to the main shaft 1073, and the roller 1379 is adapted to engage the outer periphery of a cam 1381 that is also keyed to the main shaft 1073.

When a cycle of operation of the cash register 250 is initiated, the main shaft 1073 begins to turn in a clockwise direction and, in the interval from 3° to 20° of rotation (see line 4 in FIG. 31), the cam 1380 engages the roller 1378 to pivot the lever 1375 in a clockwise direction about the shaft 1195. This pivots the lever 1373 in a counterclockwise direction about the shaft 1374 so that the locking rail 1370 is lowered out of engagement with the wheels 1334. This permits the positions of the telescoping shafts 1333 to be adjusted under the control of the plurality of differential assemblies 258. In the interval between 203° and 220° of rotation (see line 4 in FIG. 31), the cam 1381 (FIGS. 20 and 30) engages the roller 1379 to pivot the lever 1275 in a counterclockwise direction about the shaft 1195. This pivots the lever 1373 in a clockwise direction about the shaft 1374 so that the rail 1370 is elevated to again engage the gears 1334 and lock the telescoping shafts 1333 in their newly adjusted positions. In the event that the wheels 1334 are slightly displaced from a correct position, the curved surfaces on the teeth on the wheel 1334 and the upper end of the rail 1370 moves the wheels 1334 and the telescoping shafts 1333 into a proper position.

To provide means for locking the indicator drums 1311 and 1312, a pair of locking members 1382 and 1383 (FIGS. 2B, 3B and 20–22) are provided for each pair of indicating drums 1311 and 1312, respectively. The outer end of each of these members is formed with a pointed projection adapted to engage the gears 1314 and 1316. The other end of each of these arms is formed with a U-shaped portion 1382a and 1383a providing a yoke that is pivotally mounted at two points on a shaft 1384 carried between the side walls 961 and 1150. The ends of a helical spring 1385 carried on the shaft 1384 between the yoke portions 1382a and 1383a continuously biases the member 1382 in a counterclockwise direction about the shaft 1384 and the member 1383 in a clockwise direction about the shaft 1384 to engage the gears 1314 and 1316. The spring 1385 also biases the inner edges of the yoke portions 1382a and 1383a into engagement with the sides of a flat shaft 1386.

One end of the flat shaft 1386 is secured to a plate 1387 having an opening 1387a through which the shaft 1384 extends. The plate 1387 is pivotally secured to the upper end of a link 1388 (FIG. 20) by a pivot pin 1389, and the lower end of the link 1388 is pivotally connected to one of the levers 1373 by a pivot pin 1390. Thus, when the lever 1373 is pivoted about the shaft 1374 in a clockwise direction at the beginning of each cycle of operation of the cash register, the link 1388 is elevated to turn the shaft 1386 in a clockwise direction about its axis from the normal position shown in FIG. 21 to the operated position shown in FIG. 22. The opposite sides of the shaft 1336 bear against the yoke portions 1383a and 1382a of the members 1382 and 1383 so that the arms 1382 are pivoted in a clockwise direction about the shaft 1384 against the action of the springs 1385 to move the ends of these members out of engagement with the gears 1314. Similarly, this turning movement of the shaft 1387 moves the members 1383 in a counterclockwise direction about the shaft 1384 against the action of the springs 1385 to lift the ends of the members 1383 out of engagement with the gears 1316. This permits the indicator drums 1311 and 1312 to be set under the control of the differential assemblies 258. When the lever 1373 is restored to its normal position, the link 1388 moves downwardly, and the shaft 1386 is restored to its normal position shown in FIG. 21 so that the ends of the members 1382 and 1383 again engage the teeth on the gears 1314 and 1317 to secure the indicator drums 1311 and 1312 in their adjusted positions.

*Repeat control assembly 1310*

The repeat control assembly 1310 (FIGS. 23–30) provides means for locking selected ones of the transfer wheel assemblies 1345 against movement so as to permit the repeated entry of a data item into the cash register 250 under the control of the indicator slides 1155 which, in being directly geared to the transfer wheel assemblies 1345, are locked against movement when the transfer wheel assemblies 1345 are locked. In this manner, the accumulator slides 1151 and the complementary slides 1152 in the selected differential assemblies 258 are set to their prior positions by the locked indicator slides 1155. The repeat control assembly 1310 normally frees all of the transfer wheel assemblies 1345 for movement under the control of the indicator racks 1155. However, when a repeat operation is to be performed, the repeat control assembly 1310 locks selected ones of the transfer wheel assemblies 1345 against movement and also disables a drive means for the zero insertion or suppression means described above. The indicator repeat assembly 1310 is of the type shown in Patent No. 3,093,305.

The repeat control assembly 1310 includes an elongated locking rail 1395 that is slidably mounted in a guide 1396 secured to the walls 961 and 1150 of the main frame of the cash register 250. The upper end of the rail 1395 is normally received between two adjacent teeth on the gears or wheels 1347 and 1348. However, the upper edge of the rail 1395 can be provided with notches or recesses for the transfer wheel assemblies 1345 associated with any of the differential assemblies 258 that are not to be locked in set position during a repeat control operation. As an example, locking rail 1395 is provided with a recess for the two transfer wheel assemblies 1345 driven by the mode of operation and clerk differential assemblies 258. A depending portion 1395a (FIG. 23) of the rail 1395 is provided with an opening in which one arm of a lever 1397 is disposed with a compression spring 1398 interposed between the upper edge of this opening and a projection formed on an upper edge of the lever 1397. The compression spring 1398 normally biases the locking rail 1395 to the position shown in FIG. 23.

The lever 1397 is pivotally mounted on a shaft 1399 and is pivotally connected to a link 1400 by a pivot pin 1401. The other end of the link 1400 is pivotally connected to one end of a lever 1402 by a pivot pin 1403. The lever 1402 is pivotally mounted on a shaft 1404 and is provided with a slot 1405 at its other end. A roller 1406 carried on a shaft 1407 that is secured to an arm 1408 extends through the slot 1405 in the lever 1402 and is received within an upwardly open notch 1409 formed in an upper end of a cam follower lever 1410. The arm 1408 is secured to the shaft 1256 used to actuate the zero insertion or suppression means. The lever 1410 is pivotally mounted on the shaft 1195 and carries a roller 1411 that is adapted to engage the outer periphery of a cam 1412 keyed to the main shaft 1073.

This mechanism is normally effective to retract the locking rail 1395 from its locking position during each cycle of operation of the cash register 250 and is selectively rendered ineffective to retract the locking rail 1395 when a repeat operation controlled by the indicator slides 1155 is to be performed. To selectively render this drive mechanism effective and ineffective, a plate 1413 is pivotally mounted on one end of the lever 1410 by a pivot pin 1414. A depending flange 1413a on the plate 1413 extends to an opening 1415 in the lever 1410 to be engaged by an end portion 1416a (FIGS. 25–27) on a lever 1416 that is pivotally mounted on the shaft 1195. A tension spring 1417 connected between a pin 1418 on the lever 1416 and a flange on the plate 1413 normally biases the depending portion 1413a into engagement with the end portion 1416a.

When the cash register 250 is placed in operation and an indicator repeat operation is not to be performed, the repeat control assembly is disposed in the position shown in FIGS. 23 and 25. The main shaft 1073 rotates in a clockwise direction, and a pin 1419 carried on the cam 1412 moves into engagement with an indentation in the plate 1413. The continuing movement of the main shaft 1073 forces the pin 1419 against the plate 1413 and pivots this plate in a clockwise direction about the pivot pin 1414 to the position shown in FIGS. 24 and 26, the depending flange 1413a sliding in engagement with the projecting portion 1416a on the lever 1416. This movement of the pin 1419 and plate or pawl 1413 also pivots the lever 1410 in a counterclockwise direction about the shaft 1195 from the normal position shown in FIG. 23 to the displaced position shown in FIG. 24.

During this movement of the lever 1410, the pin 1407 and the roller 1406 carried thereon are displaced to the left so that the shaft 1408 rotates or pivots the shaft 1256 in a counterclockwise direction about its axis to actuate the zero suppression means in the manner described above. The movement of the roller 1406 within the slot 1405 also pivots the lever 1402 in a counterclockwise direction about the shaft 1404 so that the lever 1397 is pivoted in a clockwise direction about the shaft 1399 by the link 1400. This moves the locking rail 1395 downwardly to permit the adjustment of the transfer wheel assemblies 1345 by the indicator racks 1155 of the differential assemblies 258. A tension spring 1420 connected between the end of the pin 1407 and the frame of the cash register hold the actuating linkage for the locking rail 1395 in the position shown in FIG. 24 until after the setting and resetting of the differential assemblies 258 is completed (see lines 1 and 2 in FIG. 31). At this time, the edge of the cam 1412 engages the roller 1411 to pivot the lever 1410 in a clockwise direction to the normal position shown in FIG. 23. This returns the connected linkages to their normal positions and moves the locking rail 1395 into engagement with the transfer wheel assemblies 1345 to lock these assemblies until the beginning of the next cycle of operation.

When the repeat control assembly 1310 is operated to an actuated condition so that a data item can be repeatedly entered into the cash register 250 by locking the indicator racks 1155, the operating mechanism for releasing the locking rail 1395 is disabled, and the actuating means for the zero insertion or suppression means is also rendered ineffective. The operation of the repeat control assembly 1310 is automatically controlled in response to the depression of the repeat key 293 in the mode of operation bank 280.

The depression of the key 293 operates a linkage so that a link 897 is moved upwardly. The link 897 could also be shifted by a separate manual key. The lower end of this link is pivotally connected to the lever 1416 by a pivot pin 1421. Accordingly, when the link 897 is moved upwardly, the lever 1416 is pivoted in a counterclockwise direction about the shaft 1195 from the normal position shown in FIG. 25 to the operated position shown in FIG. 27. This pivotal movement of the lever 1416, by engagement with the depending flange or lug 1413a, pivots the pawl plate 1413 in a clockwise direction about the pivot pin 1414 so that, as shown in FIG. 27, the plate 1413 is no longer in the path of movement of the pin 1419. Therefore, when a cycle of operation of the cash register 250 is initiated and the main shaft 1073 moves in a clockwise direction, the pin 1419 passes by the plate 1413 and the above described mechanism for releasing the latching rail 1395 is not operated. In those banks of the cash register 250 in which a recess is not provided in the rail 1395 for the related transfer wheel assembly 1345, the transfer wheel assemblies are locked against movement. This means that the slides or racks 1151 and 1152 are set by engagement with the projections on the fixed indicator rack or slide 1155 to enter the same data item previously entered into the cash register and stored in the positions of the locked indicator racks 1155. When the link 897 is restored to its normal position, the plate 1413 is again moved back into the path of movement of the pin 1419 so that the locking rail 1395 is released in the manner described above.

During a repeat control operation, it is also desirable to disable the zero insertion or suppression means so that the ones of the indicator drums 1311 and 1312 adjusted to zero representing positions during the preceding cycle of operation remain in this position. Accordingly, the link 897 carries a pin 1422 (FIGS. 28 and 29) that is disposed within an opening 1423 in an arm 1424 that is pivotally mounted on a shaft 1425. In the normal position of the link 897 (FIG. 28), the free end of the arm 1424 is held out of the path of movement of the pin 1407 on the arm 1408. Thus, the lever 1408 normally can be pivoted in a counterclockwise direction to actuate the shaft 1256 and the zero suppression means.

However, when the link 897 is elevated to indicate that a repeat control operation is to be performed, the pin 1422 bears against the upper edge of the opening 1423 and pivots the arm 1424 in a counterclockwise direction about the shaft 1425 to the position shown in FIG. 29. In this position, the end of the arm 1424 is disposed in the path of movement of the pin 1407. This prevents the counterclockwise movement of the arm 1408 and the shaft 1256. It also prevents the actuation of the linkage for operating the locking rail 1395 by the spring 1420 even though the lever 1410 is not pivoted by the disabled plate 1413. When the link 897 is restored to its normal condition, the arm 1408 and the shaft 1256 are freed for normal operation.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. In an accounting machine, a plurality of differential means movable to different digit representing positions, drive means for operating said accounting machine through a cycle of operation, mode of operation control means for conditioning said accounting machine to perform different modes of operation during different cycles of operation, detecting means for determining the mode of operation for which the machine has been conditioned, coupling means for connecting the drive means to the differential means, and means controlled by said detecting means for controlling the coupling means to render said drive means effective to move said differential means at different times during a cycle of operation when said machine performs different modes of operation.

2. In an accounting machine, a plurality of differential means movable to different digit representing positions, drive means for operating said accounting machine through a cycle of operation, mode of operation control means for conditioning said accounting machine to perform different modes of operation during different cycles of operation, first means actuated by said drive means for operating said differential means during one portion of said cycle of operation, second means actuated by said drive means for operating said differential means during a different second portion of said cycle of operation, and means controlled by said mode of operation control means for rendering a selected one of said first and second means effective to operate said differential means.

3. In an accounting machine, two groups of differential means, each of said differential means being operable to different digit representing positions, drive means for operating said machine through a cycle of operation, mode of operation means for conditioning said machine to perform different modes of operation during the cycles of operation, and means controlled by said mode of operation means for rendering said drive means effective either to concurrently operate said two groups of differential means or to sequentially operate said two groups of differential means.

4. In an accounting machine, two groups of differential means, each of said differential means being operable to different digit representing positions, drive means for operating said machine through a cycle of operation, mode of operation means for conditioning said machine to perform different modes of operation during the cycles of operation, first means actuated by said drive means for operating a first one of said two groups of differential means, second means actuated by said drive means for operating a second one of said two groups of differential means, and means controlled by said mode of operation means for selectively connecting said second group of differential means to said first means to permit said second group of differential means to be operated by either said first means or said second means.

5. In an accounting machine, a plurality of differential means adjustable to different digit representing positions, a plurality of keys for controlling the setting of said differential means, accumulator means for controlling the setting of said differential means, drive means for operating said accounting machine through a cycle of operation, and control means for rendering said drive means effective to operate said differential means during one portion of said cycle of operation when said differential means are controlled by said plurality of keys and to operate said differential means during a different portion of said cycle of operation when said differential means are controlled by said accumulator means.

6. In an accounting machine, a plurality of ordered differential means each independently operable to different spaced digit representing positions, indicating means controlled by the plurality of differential means, two separate groups of keys for controlling the operation of a lower order group and a higher order group of said differential means to said digit representing positions, an accumulator assembly including an accumulator means for each order of said differential means, successive accumulator means in the assembly being linked by carry means, and means for rendering only the lower order group of differential means effective to enter data into the corresponding orders of said accumulator means when both groups of said differential means are operated to control said indicating means in accordance with the keys in both of the two separate groups of keys.

7. The accounting machine set forth in claim 6 in which the control means includes means rendering the differential means in both the higher and lower order groups effective to operate the accumulator means in the corresponding orders of the accumulator assembly.

8. In an accounting machine, a plural order accumulator means for storing digital data, a plural order differential assembly for transferring digital data into said accumulator means, drive means for operating said machine through a cycle of operation, said accumulator means being responsive to control by said differential assembly during a given portion of said cycle of operation, first means for operating said differential assembly during said one portion of the cycle of operation, second means for operating said differential assembly during another portion of said cycle of operation, and means for controlling the entry of digital data into said accumulator means including means for rendering a selected one of said first and second means effective to operate said differential assembly.

9. In an accounting machine, indicating means, accumulator means having an individual accumulator in each of a plurality of orders, a plurality of differential means equal in number to the number of orders in said accumulator, a plurality of banks of keys operable to control the setting of said differential means in digit representing positions, first means for moving said differential means from normal positions to digit representing positions selected by operated ones of the keys in said banks, means controlled by said differential means for operating said indicating means to indicate the settings to which the differential means have been moved, means for rendering said accumulator means responsive to movement of all of said differential means, means for returning part of said differential means from digit representing positions to normal positions to enter digital data in said accumulator means, means for preventing response of said accumulator means to movement of said differential means, and means for then returning the remaining differential means from digit representing positions to normal positions.

10. In an accounting machine in which a pair of differential elements are sequentially or concurrently moved to complementary digit representing positions under the control of a locking means, a mode of operation differential means operable to different settings to condition the machine for different modes of operation, a control element adjusted to different positions corresponding to the different settings of the mode of operation differential means, sensing means for detecting the position of said control element, and means controlled by said sensing means for operating said locking means to permit concurrent or sequential movement of said pair of differential elements.

11. In an accounting machine in which a pair of differential elements are sequentially or concurrently moved to complementary digit representing positions under the control of a locking means, a mode of operation differential means operable to different settings to condition the machine for different modes of operation, a control element adjusted to different positions corresponding to the different settings of the mode of operation differential means, sensing means for detecting the position of said control element, drive means for operating said machine through cycles of operation, means actuated by said drive means for adjusting said mode of operation differential means to one of the different settings during one portion of each cycle of operation so as to adjust the control element to a corresponding setting, means actuated by said drive means during a subsequent portion of each cycle of operation for actuating said sensing means to detect the position of said control element, and means controlled by said sensing means for operating said locking means to condition said pair of differential elements for sequential or concurrent movement in accordance with the setting of the mode of operation differential means, and means for then initiating movement of said pair of differential elements.

12. In an accounting machine, a supporting structure, a plurality of differential means movably mounted on the supporting structure and operable to different data representing positions, two separate groups of indicating elements movably mounted on the supporting structure in positions spaced from each other and having data representing indicia thereon, said two groups of indicating elements providing data representations in different arrangements, and means for operating said groups of indicating elements to positions corresponding to the data representing positions of said differential means comprising a plurality of transfer gear assemblies carried on the supporting structure and each actuated by one of said differential means, each of said transfer gear assemblies including first, second, and third gears rotatably mounted on a common axis and disposed in parallel, side-by-side relation, each of said differential means being coupled to and operating the first gear in the related transfer gear assembly and being coupled to and operating the related one of the indicating elements in the first group thereof, said first gear being connected to the second gear, a plurality of transfer shafts carried on the supporting structure and each connecting the second gear in one of said transfer gear assemblies to the third gear in another one of said transfer gear assemblies, each of said third gears being drivingly connected to one of the indicating elements in said second group thereof, and means mounting the transfer shafts on the supporting structure for rotation about a common axis.

13. In an accounting machine including a supporting structure, a plurality of differential actuators movably mounted on the supporting structure, a first plurality of indicator drums rotatably mounted on the supporting structure, a second plurality of indicator drums rotatably mounted on the supporting structure spaced from and generally aligned with the first plurality of indicator drums, means drivingly connecting each of said first plurality of drums to one of said differential actuators, a plurality of transfer gear assemblies, each including first and second gear means disposed in parallel, side-by-side relation, the first gear means being coupled to and driven by one of said differential actuators and the adjacent second gear means being drivingly connected to the one of the indicating drums in the second plurality that is generally aligned with the one of the indicator drums in the first plurality that is driven by said one differential actuator, means mounting the first and second gear means in all of the transfer gear units on the supporting structure for rotation about a common axis, a plurality of transfer shafts each connecting the first gear means in one of said transfer gear units with the second gear means in another one of said transfer gear units, and means mounting the transfer shafts on the supporting structure for rotation about a common axis extending generally parallel to the axis of the transfer gear units.

14. The accounting machine set forth in claim 13 including a plurality of recording means, and a plurality of output shafts rotatably mounted on the structure and each connecting one of said recording means to the second gear means in one of said transfer gear units.

15. In an accounting machine, a supporting structure, a plurality of indicating means movably mounted on the supporting structure, a plurality of differential actuators movably mounted on the supporting structure for setting said indicating means, a plurality of concentrically arranged tubular shafts, means fixably mounting the concentric shafts on the supporting structure for rotation about a common axis, the ends of said shafts being spaced axially from each other at one end of said shafts, a gear carried on the spaced end of each of said shafts, a motion transmitting means connecting each of the differential actuators to one of the indicating means, each motion transmitting means including one of said shafts and the gear carried thereon, a resilient tubular bearing disposed between each pair of adjacent shafts at said one end of said shafts, and a resilient spacing sleeve disposed between each of said gears and the adjacent tubular bearing to hold the bearing in place, said tubular bearings and said spacing sleeves each having an axial slot and being of such resilience as to permit the slots therein to be expanded to the diameter of the shaft on which they are mounted to permit the sleeves and bearings to be removed while the tubular shafts remain mounted on the supporting structure in assembled concentric relation, the spacing sleeves being first expanded and removed to permit the tubular bearing to be moved axially to the position previously occupied by the adjacent spacing sleeve and then expanded and moved.

16. In an accounting machine, a supporting structure, a pair of differential elements movably mounted on the supporting structure for movement in opposite directions to complementary positions, a pair of differential levers coupled to the differential elements for actuating said differential elements, a pair of pivot structures carried on the supporting structures and each pivotally mounting a lower end of one of said levers on said supporting structure, and means for manually adjusting the free movement of said levers including cam means movably mounted on the supporting structure and bearing against the lower end of one of said levers and an eccentrically mounted link carried on the supporting structure forming the pivot structure for the other of said levers.

References Cited
UNITED STATES PATENTS

| | | | |
|---|---|---|---|
| 1,812,020 | 6/1931 | Robertson | 235—23 |
| 2,070,419 | 2/1937 | Bornkessel et al. | 235—2 |
| 2,139,718 | 12/1938 | Breitling | 235—2 |
| 2,173,246 | 9/1939 | Aurbach | 235—2 |
| 2,246,086 | 6/1941 | Austin | 308—238 |
| 2,571,645 | 10/1951 | Zurbuchen | 235—23 |
| 2,581,624 | 1/1952 | Boyden et al. | 235—60 |
| 2,858,067 | 10/1958 | Styner et al. | 235—23 |
| 3,127,101 | 3/1964 | Moreno-Banuelos et al. | 235—23 |
| 3,145,923 | 8/1964 | Chall | 235—60 |
| 3,161,354 | 12/1964 | Christian et al. | 235—60.47 |

STEPHEN J. TOMSKY, *Primary Examiner.*

LEO SMILOW, RICHARD B. WILKINSON, *Examiners.*

J. G. MURRAY, *Assistant Examiner.*